US011412250B2

(12) United States Patent
Chen et al.

(10) Patent No.: US 11,412,250 B2
(45) Date of Patent: Aug. 9, 2022

(54) METHOD AND APPARATUS FOR DERIVING TEMPORAL MOTION

(71) Applicant: ALIBABA GROUP HOLDING LIMITED, Grand Cayman (KY)

(72) Inventors: Jie Chen, Beijing (CN); Jiancong Luo, Skillman, NJ (US); Yan Ye, San Diego, CA (US); Ru-Ling Liao, Beijing (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 17/214,717

(22) Filed: Mar. 26, 2021

(65) Prior Publication Data

US 2021/0306657 A1   Sep. 30, 2021

Related U.S. Application Data

(60) Provisional application No. 63/035,923, filed on Jun. 8, 2020, provisional application No. 63/000,438, filed on Mar. 26, 2020.

(51) Int. Cl.
*H04N 19/00* (2014.01)
*H04N 19/52* (2014.01)
*H04N 19/55* (2014.01)
*H04N 19/172* (2014.01)

(52) U.S. Cl.
CPC ........... *H04N 19/52* (2014.11); *H04N 19/172* (2014.11); *H04N 19/55* (2014.11)

(58) Field of Classification Search
CPC ....... H04N 19/52; H04N 19/172; H04N 19/55
See application file for complete search history.

(56) References Cited

U.S. PATENT DOCUMENTS

| 9,300,959 | B2* | 3/2016 | Yu | H04N 19/105 |
| 9,319,681 | B2* | 4/2016 | Yu | H04N 19/463 |
| 9,350,992 | B2* | 5/2016 | Yu | H04N 19/174 |
| 9,467,694 | B2* | 10/2016 | Yu | H04N 19/463 |
| 9,497,472 | B2* | 11/2016 | Coban | H04N 19/129 |
| 9,549,177 | B2* | 1/2017 | Yu | H04N 19/137 |

(Continued)

FOREIGN PATENT DOCUMENTS

WO   WO 2019/131651 A1   7/2019

OTHER PUBLICATIONS

PCT International Search Report and Written Opinion dated Jun. 10, 2021, issued in corresponding International Application No. PCT/US2021/024516 (10 pgs.).

(Continued)

*Primary Examiner* — Frank F Huang
(74) *Attorney, Agent, or Firm* — Finnegan, Henderson, Farabow, Garrett & Dunner, LLP

(57) ABSTRACT

Methods and apparatuses for video processing include: splitting a target basic processing unit (BPU) of a target picture into a set of basic processing sub-units (BPSUs); determining a set of collocated BPUs in a reference picture associated with the target picture, wherein a BPSU of the set of BPSUs corresponds to a collocated BPU of the set of collocated BPUs; determining a motion vector associated with the BPSU based on motion information associated with the corresponding collocated BPU; and applying motion compensation for each of the set of BPSUs based on the motion vector associated with the BPSU.

30 Claims, 16 Drawing Sheets

(56) References Cited

U.S. PATENT DOCUMENTS

| | | | |
|---|---|---|---|
| 9,961,370 B2* | 5/2018 | Chen | H04N 19/513 |
| 10,341,638 B2* | 7/2019 | Lin | H04N 19/52 |
| 10,390,039 B2* | 8/2019 | Zhu | H04N 19/54 |
| 10,735,725 B2* | 8/2020 | Reddy | H04N 19/82 |
| 11,017,591 B2* | 5/2021 | Oh | G06T 17/00 |
| 11,095,877 B2* | 8/2021 | Kumar | H04N 19/103 |
| 2018/0124398 A1 | 5/2018 | Park et al. | |

OTHER PUBLICATIONS

Call for New generation AVS3 video coding proposals, AVS-N2509, Dec. 2017, 4 pages.

Fang S., HPM, ftp://47.93.196.121/Public/codec/video codec/HPM, Aug. 23, 2019, 7 pages.

Liang F., "AVS3-P2(CD4.0)", AVS-N2724, Aug. 2019, 228 pages.

* cited by examiner

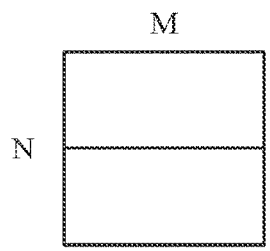
FIG. 7A
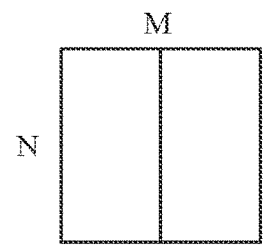
FIG. 7B
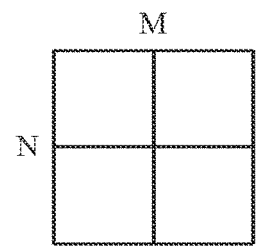
FIG. 7C
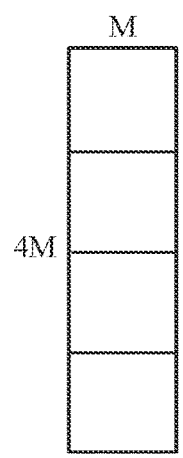
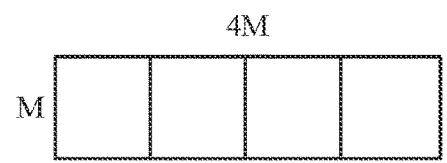
FIG. 8B
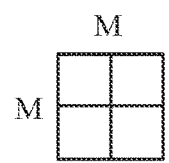
FIG. 8C
FIG. 8A
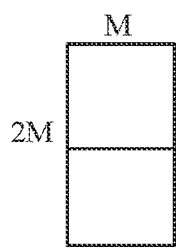
FIG. 8D
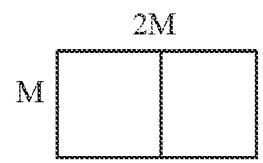
FIG. 8E

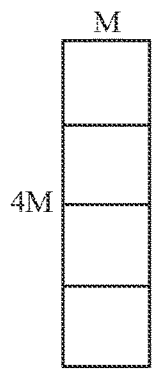
FIG. 9A
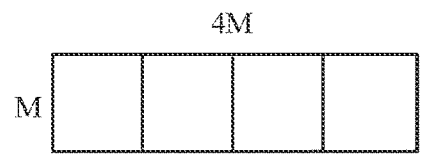
FIG. 9B
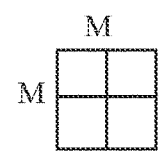
FIG. 9C
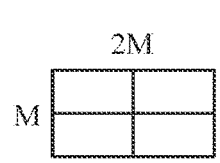
FIG. 9D
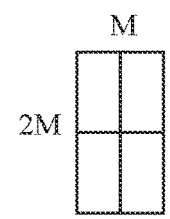
FIG. 9E
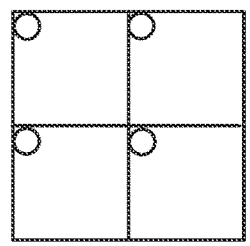 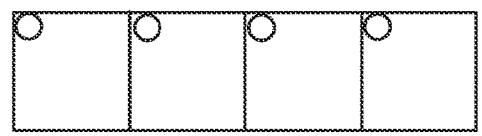 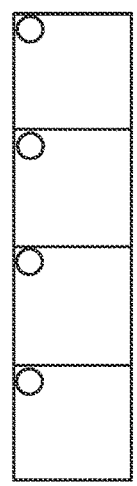
FIG. 10

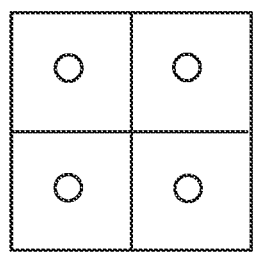 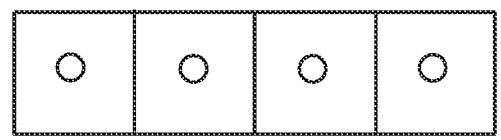 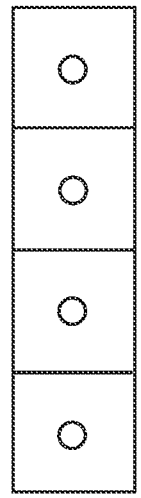
FIG. 11
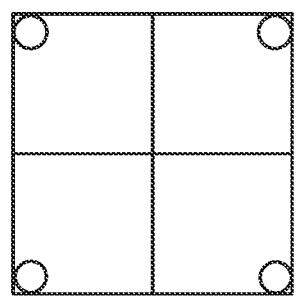
FIG. 12

Table 1: Syntax for Deriving TMVP

| 1 | if (reference index 0 of collocated block is available && reference index 1 of collocated block is available) |
|---|---|
| 2 | { |
| 3 | Derive MV0 of the current block based on MV0 and reference index 0 of the collocated block |
| 4 | Derive MV1 of the current block based on MV1 and reference index 1 of the collocated block |
| 5 | } |
| 6 | else if (reference index 0 of collocated block is available && reference index 1 of collocated block is unavailable) |
| 7 | { |
| 8 | derive MV0 and MV1 of the current block based on MV0 and reference index 0 of the collocated block |
| 9 | } |
| 10 | else if (reference index 0 of collocated block is unavailable && reference index 1 of collocated block is available) |
| 11 | { |
| 12 | derive MV0 and MV1 of the current block based on MV1 and reference index 1 of the collocated block |
| 13 | } |
| 14 | Else |
| 15 | { |
| 16 | Derive MV0 and MV1 of the current block based on the MV of spatial neighboring block |
| 17 | } |

FIG. 13

Table 2: Syntax for Deriving TMVP

| 1 | if (reference index 0 of collocated block is available) |
|---|---|
| 2 | { |
| 3 | Derive MV0 and MV1 of the current block based on MV0 and reference index 0 of the collocated block |
| 4 | } |
| 5 | else if (reference index 1 of collocated block is available) |
| 6 | { |
| 7 | derive Derive MV0 and MV1 of the current block based on MV1 and reference index 1 of the collocated block |
| 8 | } |
| 9 | else |
| 10 | { |
| 11 | Derive MV0 and MV1 of the current block based on the MV of spatial neighboring block |
| 12 | } |

FIG. 14

Table 3: Look-up Table to Determine BPSU Used for Target BPSU

| Availability | | | | BPSU Used for Target BPSU | | | |
|---|---|---|---|---|---|---|---|
| Sb3 | Sb2 | Sb1 | Sb0 | Sb3 | Sb2 | Sb1 | Sb0 |
| 0 | 0 | 0 | 0 | CU | CU | CU | CU |
| 0 | 0 | 0 | 1 | 0 | 0 | 0 | 0 |
| 0 | 0 | 1 | 0 | 1 | 1 | 1 | 1 |
| 0 | 0 | 1 | 1 | 1 | 0 | 1 | 0 |
| 0 | 1 | 0 | 0 | 2 | 2 | 2 | 2 |
| 0 | 1 | 0 | 1 | 2 | 2 | 0 | 0 |
| 0 | 1 | 1 | 0 | 2 | 2 | 1 | 1 |
| 0 | 1 | 1 | 1 | 2 | 2 | 1 | 0 |
| 1 | 0 | 0 | 0 | 3 | 3 | 3 | 3 |
| 1 | 0 | 0 | 1 | 3 | 3 | 3 | 0 |
| 1 | 0 | 1 | 0 | 3 | 3 | 1 | 1 |
| 1 | 0 | 1 | 1 | 3 | 3 | 1 | 0 |
| 1 | 1 | 0 | 0 | 3 | 2 | 3 | 2 |
| 1 | 1 | 0 | 1 | 3 | 2 | 3 | 0 |
| 1 | 1 | 1 | 0 | 3 | 2 | 1 | 1 |
| 1 | 1 | 1 | 1 | 3 | 2 | 1 | 0 |

FIG. 15

METHOD AND APPARATUS FOR DERIVING TEMPORAL MOTION

CROSS-REFERENCE TO RELATED APPLICATIONS

The present disclosure claims priority to U.S. provisional application No. 63/000,438, filed on Mar. 26, 2020, and to U.S. provisional application No. 63/035,923, filed on Jun. 8, 2020, the contents of which are incorporated herein by reference in their entireties.

TECHNICAL FIELD

The present disclosure generally relates to video processing, and more particularly, to methods and apparatuses for deriving temporal motion information.

BACKGROUND

A video is a set of static pictures (or "frames") capturing the visual information. To reduce the storage memory and the transmission bandwidth, a video can be compressed before storage or transmission and decompressed before display. The compression process is usually referred to as encoding and the decompression process is usually referred to as decoding. There are various video coding formats which use standardized video coding technologies, most commonly based on prediction, transform, quantization, entropy coding and in-loop filtering. The video coding standards, such as the High Efficiency Video Coding (e.g., HEVC/H.265) standard, the Versatile Video Coding (e.g., VVC/H.266) standard, and Audio Video coding Standard (AVS), specifying the specific video coding formats, are developed by standardization organizations. With more and more advanced video coding technologies being adopted in the video standards, the coding efficiency of the new video coding standards get higher and higher.

SUMMARY OF THE DISCLOSURE

The embodiments of present disclosure provide methods and apparatuses for video processing. In an aspect, a non-transitory computer-readable medium is provided, which stores a set of instructions that is executable by at least one processor of an apparatus to cause the apparatus to perform a method. The method includes: splitting a target basic processing unit (BPU) of a target picture into a set of basic processing sub-units (BPSUs); determining a set of collocated BPUs in a reference picture associated with the target picture, wherein a BPSU of the set of BPSUs corresponds to a collocated BPU of the set of collocated BPUs; determining a motion vector associated with the BPSU based on motion information associated with the corresponding collocated BPU; and applying motion compensation for each of the set of BPSUs based on the motion vector associated with the BPSU.

In another aspect, a non-transitory computer-readable medium is provided, which stores a set of instructions that is executable by at least one processor of an apparatus to cause the apparatus to perform a method. The method includes: determining, for a target basic processing unit (BPU) of a target picture, a collocated BPU in a reference picture associated with the target picture, wherein the reference picture is a B-picture; determining whether motion information associated with the collocated BPU is available; based on a determination that the motion information associated with collocated BPU is available, determining a motion vector associated with the target BPU based on the motion information; and applying motion compensation for the target BPU based on the motion vector associated with the target BPU.

In another aspect, an apparatus for video processing is provided. The apparatus includes a memory configured to store a set of instructions and one or more processors communicatively coupled to the memory and configured to execute the set of instructions to cause the apparatus to perform: splitting a target basic processing unit (BPU) of a target picture into a set of basic processing sub-units (BPSUs); determining a set of collocated BPUs in a reference picture associated with the target picture, wherein a BPSU of the set of BPSUs corresponds to a collocated BPU of the set of collocated BPUs; determining a motion vector associated with the BPSU based on motion information associated with the corresponding collocated BPU; and applying motion compensation for each of the set of BPSUs based on the motion vector associated with the BPSU.

In another aspect, an apparatus for video processing is provided. The apparatus includes a memory configured to store a set of instructions and one or more processors communicatively coupled to the memory and configured to execute the set of instructions to cause the apparatus to perform: determining, for a target basic processing unit (BPU) of a target picture, a collocated BPU in a reference picture associated with the target picture, wherein the reference picture is a B-picture; determining whether motion information associated with the collocated BPU is available; based on a determination that the motion information associated with collocated BPU is available, determining a motion vector associated with the target BPU based on the motion information; and applying motion compensation for the target BPU based on the motion vector associated with the target BPU.

In another example embodiment, a computer-implemented method is provided. The method includes: splitting a target basic processing unit (BPU) of a target picture into a set of basic processing sub-units (BPSUs); determining a set of collocated BPUs in a reference picture associated with the target picture, wherein a BPSU of the set of BPSUs corresponds to a collocated BPU of the set of collocated BPUs; determining a motion vector associated with the BPSU based on motion information associated with the corresponding collocated BPU; and applying motion compensation for each of the set of BPSUs based on the motion vector associated with the BPSU.

In another example embodiment, a computer-implemented method is provided. The method includes: determining, for a target basic processing unit (BPU) of a target picture, a collocated BPU in a reference picture associated with the target picture, wherein the reference picture is a B-picture; determining whether motion information associated with the collocated BPU is available; based on a determination that the motion information associated with collocated BPU is available, determining a motion vector associated with the target BPU based on the motion information; and applying motion compensation for the target BPU based on the motion vector associated with the target BPU.

BRIEF DESCRIPTION OF THE DRAWINGS

Embodiments and various aspects of present disclosure are illustrated in the following detailed description and the accompanying figures. Various features shown in the figures are not drawn to scale.

FIGS. 7A-7C illustrate example partitioning patterns for splitting a target BPU into a fixed number of basic processing sub-units (BPSUs), consistent with some embodiments of the disclosure.

FIGS. 8A-8E illustrate example partitioning patterns for splitting a target BPU into multiple BPSUs based on a shape of the target BPU, consistent with some embodiments of the disclosure.

FIGS. 9A-9E illustrate example partitioning patterns for splitting a target BPU into a fixed number of BPSUs based on a shape of the target BPU, consistent with some embodiments of the disclosure.

FIG. 10 illustrates example top-left positions of BPSUs for determining a collocated BPU for each BPSU, consistent with some embodiments of the disclosure.

FIG. 11 illustrates example center positions of BPSUs for determining a collocated BPU for each BPSU, consistent with some embodiments of the disclosure.

FIG. 12 illustrates example corner positions of cross-split BPSUs in a target BPU for determining a collocated BPU for each BPSU, consistent with some embodiments of the disclosure.

FIG. 13 illustrates a table of example syntax for a first method of deriving a temporal motion vector predictor (TMVP), consistent with some embodiments of this disclosure.

FIG. 14 illustrates a table of example syntax for a second method of deriving a TMVP, consistent with some embodiments of this disclosure.

FIG. 15 illustrates an example table for determining a neighboring BPSU of a target BPSU, consistent with some embodiments of this disclosure.

DETAILED DESCRIPTION

Figure 1:
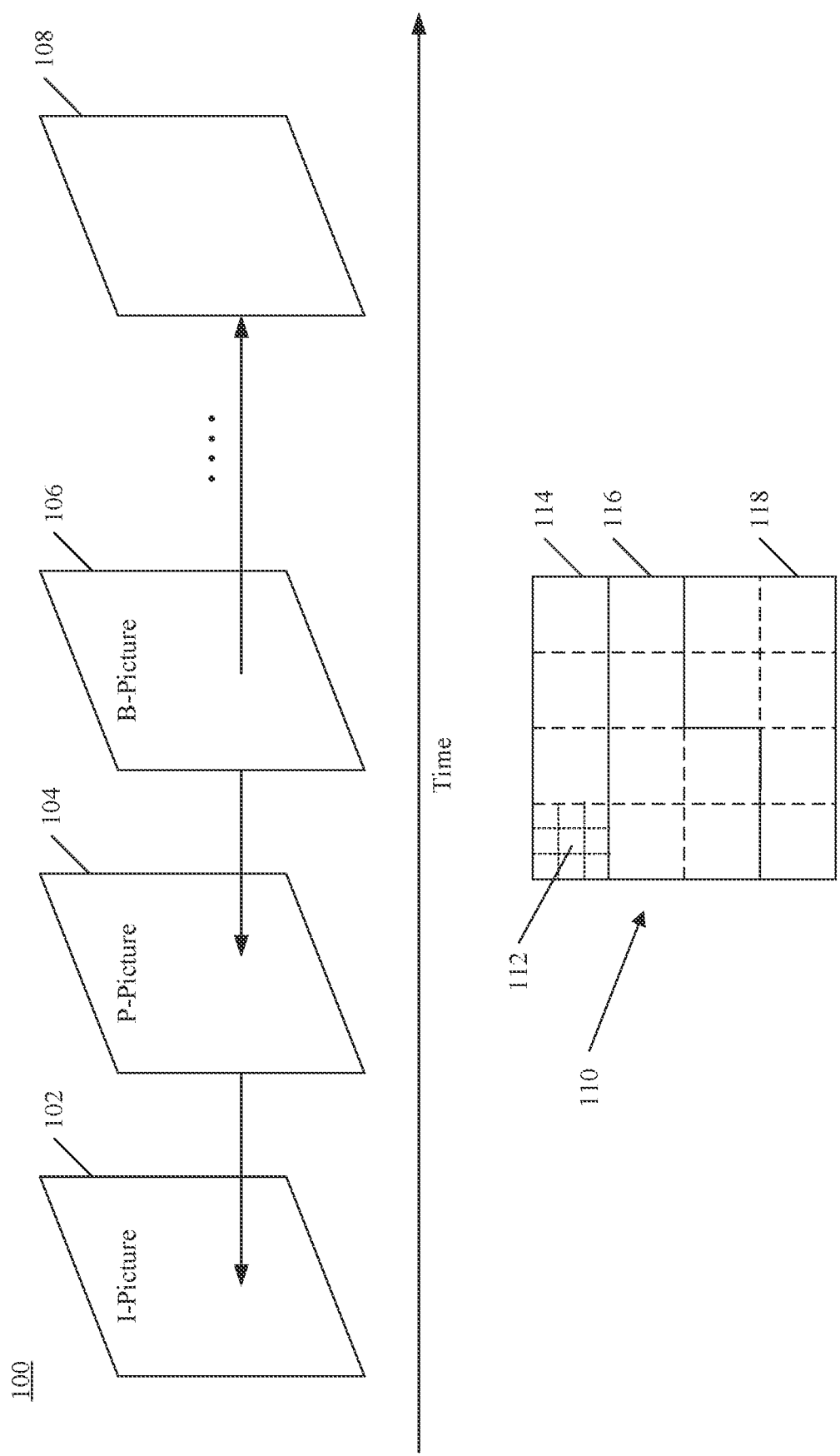
FIG. 1 is a schematic diagram illustrating structures of an example video sequence, consistent with some embodiments of this disclosure.

Reference can now be made in detail to example embodiments, examples of which are illustrated in the accompanying drawings. The following description refers to the accompanying drawings in which the same numbers in different drawings represent the same or similar elements unless otherwise represented. The implementations set forth in the following description of example embodiments do not represent all implementations consistent with the invention. Instead, they are merely examples of apparatuses and methods consistent with aspects related to the invention as recited in the appended claims. Particular aspects of present disclosure are described in greater detail below. The terms and definitions provided herein control, if in conflict with terms and/or definitions incorporated by reference.

A video is a set of static pictures (or "frames") arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for surveillance, conferencing, or live broadcasting.

For reducing the storage space and the transmission bandwidth needed by such applications, the video can be compressed before storage and transmission and decompressed before the display. The compression and decompression can be implemented by software executed by a processor (e.g., a processor of a generic computer) or specialized hardware. The module for compression is generally referred to as an "encoder," and the module for decompression is generally referred to as a "decoder." The encoder and decoder can be collectively referred to as a "codec." The encoder and decoder can be implemented as any of a variety of suitable hardware, software, or a combination thereof. For example, the hardware implementation of the encoder and decoder can include circuitry, such as one or more microprocessors, digital signal processors (DSPs), application-specific integrated circuits (ASICs), field-programmable gate arrays (FPGAs), discrete logic, or any combinations thereof. The software implementation of the encoder and decoder can include program codes, computer-executable instructions, firmware, or any suitable computer-implemented algorithm or process fixed in a computer-readable medium. Video compression and decompression can be implemented by various algorithms or standards, such as MPEG-1, MPEG-2, MPEG-4, H.26x series, or the like. In some applications, the codec can decompress the video from a first coding standard and re-compress the decompressed video using a second coding standard, in which case the codec can be referred to as a "transcoder."

The video encoding process can identify and keep useful information that can be used to reconstruct a picture and disregard unimportant information for the reconstruction. If the disregarded, unimportant information cannot be fully reconstructed, such an encoding process can be referred to as "lossy." Otherwise, it can be referred to as "lossless." Most encoding processes are lossy, which is a tradeoff to reduce the needed storage space and the transmission bandwidth.

The useful information of a picture being encoded (referred to as a "current picture" or "target picture") include changes with respect to a reference picture (e.g., a picture previously encoded and reconstructed). Such changes can include position changes, luminosity changes, or color changes of the pixels, among which the position changes are mostly concerned. Position changes of a group of pixels that represent an object can reflect the motion of the object between the reference picture and the target picture.

A picture coded without referencing another picture (i.e., it is its own reference picture) is referred to as an "I-picture." A picture is referred to as a "P-picture" if some or all blocks (e.g., blocks that generally refer to portions of the video picture) in the picture are predicted using intra prediction or inter-prediction with one reference picture (e.g., uni-prediction). A picture is referred to as a "B-picture" if at least one block in it is predicted with two reference pictures (e.g., bi-prediction).

FIG. 1 illustrates structures of an example video sequence 100, consistent with some embodiments of this disclosure. Video sequence 100 can be a live video or a video having been captured and archived. Video 100 can be a real-life video, a computer-generated video (e.g., computer game video), or a combination thereof (e.g., a real-life video with augmented-reality effects). Video sequence 100 can be inputted from a video capture device (e.g., a camera), a video archive (e.g., a video file stored in a storage device) containing previously captured video, or a video feed interface (e.g., a video broadcast transceiver) to receive video from a video content provider.

As shown in FIG. 1, video sequence 100 can include a series of pictures arranged temporally along a timeline, including pictures 102, 104, 106, and 108. Pictures 102-106 are continuous, and there are more pictures between pictures 106 and 108. In FIG. 1, picture 102 is an I-picture, the reference picture of which is picture 102 itself. Picture 104 is a P-picture, the reference picture of which is picture 102, as indicated by the arrow. Picture 106 is a B-picture, the reference pictures of which are pictures 104 and 108, as indicated by the arrows. In some embodiments, the reference picture of a picture (e.g., picture 104) can be not immediately preceding or following the picture. For example, the reference picture of picture 104 can be a picture preceding picture 102. It should be noted that the reference pictures of pictures 102-106 are only examples, and the present disclosure does not limit embodiments of the reference pictures as the examples shown in FIG. 1.

Typically, video codecs do not encode or decode an entire picture at one time due to the computing complexity of such tasks. Rather, they can split the picture into basic segments, and encode or decode the picture segment by segment. Such basic segments are referred to as basic processing units ("BPSU") in the present disclosure. For example, structure 110 in FIG. 1 shows an example structure of a picture of video sequence 100 (e.g., any of pictures 102-108). In structure 110, a picture is divided into 4×4 basic processing units, the boundaries of which are shown as dash lines. In some embodiments, the basic processing units can be referred to as "macroblocks" in some video coding standards (e.g., MPEG family, H.261, H.263, or H.264/AVC), or as "coding tree units" ("CTUs") in some other video coding standards (e.g., H.265/HEVC, H.266/VVC, or AVS). The basic processing units can have variable sizes in a picture, such as 128×128, 64×64, 32×32, 16×16, 4×8, 16×32, or any arbitrary shape and size of pixels. The sizes and shapes of the basic processing units can be selected for a picture based on the balance of coding efficiency and levels of details to be kept in the basic processing unit.

The basic processing units can be logical units, which can include a group of different types of video data stored in a computer memory (e.g., in a video frame buffer). For example, a basic processing unit of a color picture can include a luma component (Y) representing achromatic brightness information, one or more chroma components (e.g., Cb and Cr) representing color information, and associated syntax elements, in which the luma and chroma components can have the same size of the basic processing unit. The luma and chroma components can be referred to as "coding tree blocks" ("CTB s") in some video coding standards (e.g., H.265/HEVC, H.266/VVC, or AVS). Any operation performed to a basic processing unit can be repeatedly performed to each of its luma and chroma components.

Video coding has multiple stages of operations, examples of which are shown in FIGS. 2A-2B and FIGS. 3A-3B. For each stage, the size of the basic processing units can still be too large for processing, and thus can be further divided into segments referred to as "basic processing sub-units" ("BP-SUs") in the present disclosure. In some embodiments, the basic processing sub-units can be referred to as "blocks" in some video coding standards (e.g., MPEG family, H.261, H.263, or H.264/AVC), or as "coding units" ("CUs") in some other video coding standards (e.g., H.265/HEVC, H.266/VVC, or AVS). A basic processing sub-unit can have the same or smaller size than the basic processing unit. Similar to the basic processing units, basic processing sub-units are also logical units, which can include a group of different types of video data (e.g., Y, Cb, Cr, and associated syntax elements) stored in a computer memory (e.g., in a video frame buffer). Any operation performed to a basic processing sub-unit can be repeatedly performed to each of its luma and chroma components. It should be noted that such division can be performed to further levels depending on processing needs. It should also be noted that different stages can divide the basic processing units using different schemes.

Figure 2A:
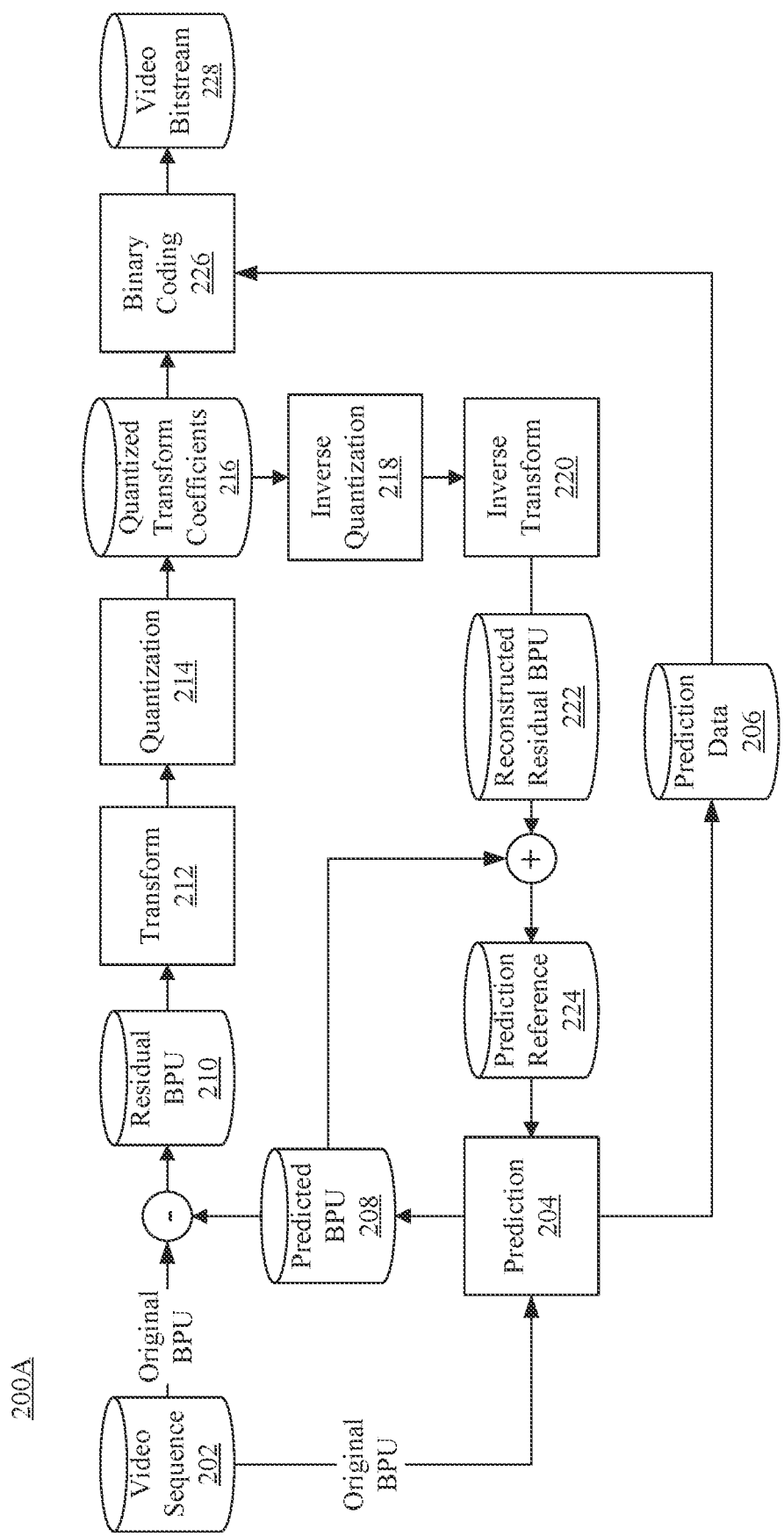
FIG. 2A illustrates a schematic diagram of an example encoding process of a hybrid video coding system, consistent with embodiments of the disclosure.
Figure 2B:
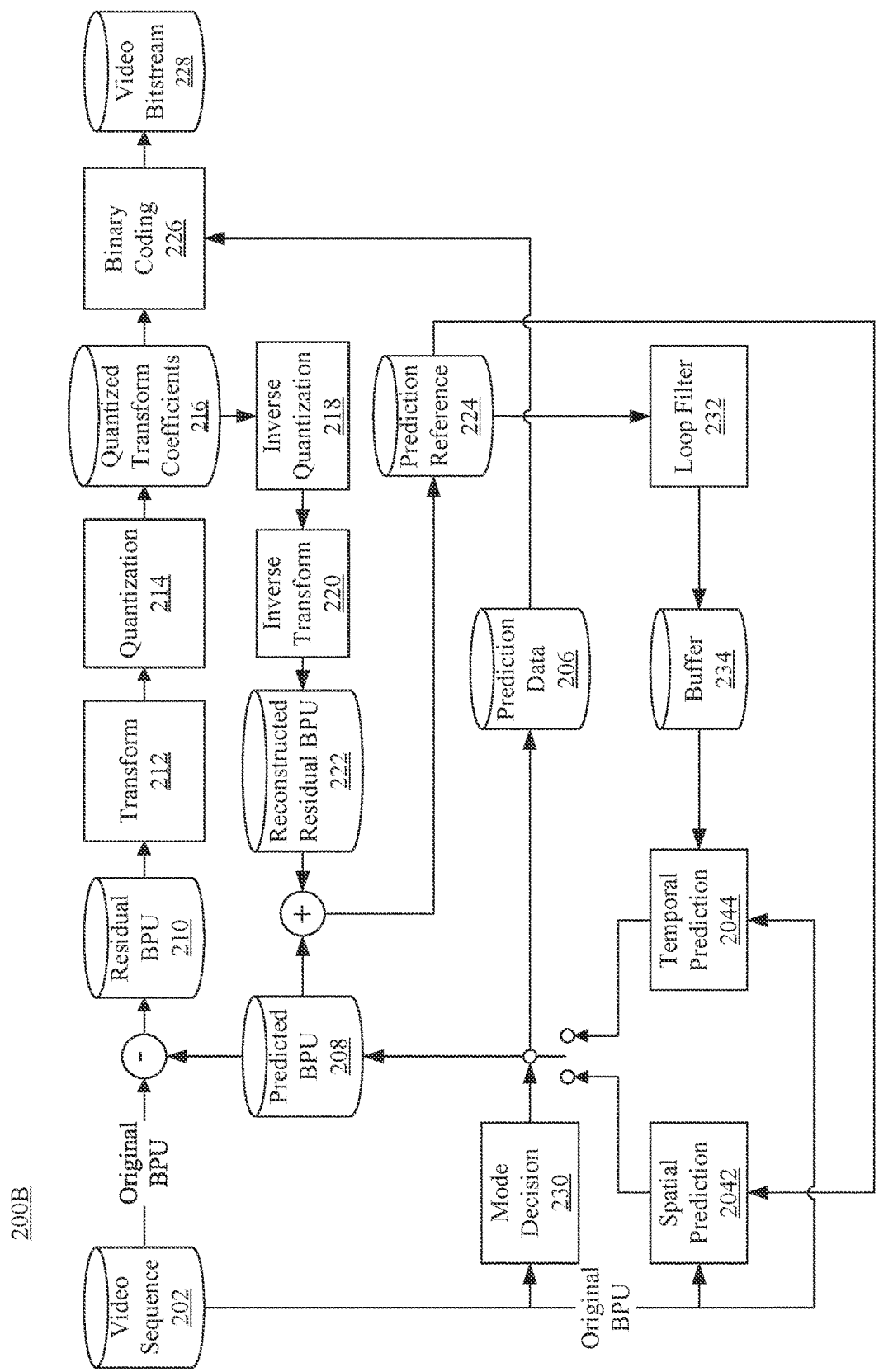
FIG. 2B illustrates a schematic diagram of another example encoding process of a hybrid video coding system, consistent with embodiments of the disclosure.

For example, at a mode decision stage (an example of which is shown in FIG. 2B), the encoder can decide what prediction mode (e.g., intra-picture prediction or inter-picture prediction) to use for a basic processing unit, which can be too large to make such a decision. The encoder can split the basic processing unit into multiple basic processing sub-units (e.g., CUs as in H.265/HEVC, H.266/VVC, or AVS), and decide a prediction type for each individual basic processing sub-unit.

For another example, at a prediction stage (an example of which is shown in FIGS. 2A-2B), the encoder can perform prediction operation at the level of basic processing sub-units (e.g., CUs). However, in some cases, a basic processing sub-unit can still be too large to process. The encoder can further split the basic processing sub-unit into smaller segments (e.g., referred to as "prediction blocks" or "PBs" in H.265/HEVC or H.266/VVC), at the level of which the prediction operation can be performed.

For another example, at a transform stage (an example of which is shown in FIGS. 2A-2B), the encoder can perform a transform operation for residual basic processing sub-units (e.g., CUs). However, in some cases, a basic processing sub-unit can still be too large to process. The encoder can further split the basic processing sub-unit into smaller segments (e.g., referred to as "transform blocks" or "TBs" in H.265/HEVC or H.266/VVC), at the level of which the transform operation can be performed. It should be noted that the division schemes of the same basic processing sub-unit can be different at the prediction stage and the transform stage. For example, in H.265/HEVC or H.266/VVC, the prediction blocks and transform blocks of the same CU can have different sizes and numbers.

In structure 110 of FIG. 1, basic processing unit 112 is further divided into 3×3 basic processing sub-units, the boundaries of which are shown as dotted lines. Different basic processing units of the same picture can be divided into basic processing sub-units in different schemes.

In some implementations, to provide the capability of parallel processing and error resilience to video encoding and decoding, a picture can be divided into regions for processing, such that, for a region of the picture, the encoding or decoding process can depend on no information from any other region of the picture. In other words, each region of the picture can be processed independently. By doing so, the codec can process different regions of a picture in parallel, thus increasing the coding efficiency. Also, when data of a region is corrupted in the processing or lost in network transmission, the codec can correctly encode or decode other regions of the same picture without reliance on the corrupted or lost data, thus providing the capability of error resilience. In some video coding standards, a picture can be divided into different types of regions. For example, H.265/HEVC and H.266/VVC provide two types of regions: "slices" and "tiles." It should also be noted that different pictures of video sequence 100 can have different partition schemes for dividing a picture into regions.

For example, in FIG. 1, structure 110 is divided into three regions 114, 116, and 118, the boundaries of which are shown as solid lines inside structure 110. Region 114 includes four basic processing units. Each of regions 116 and 118 includes six basic processing units. It should be noted that the basic processing units, basic processing sub-units, and regions of structure 110 in FIG. 1 are only examples, and the present disclosure does not limit embodiments thereof.

FIG. 2A illustrates a schematic diagram of an example encoding process 200A, consistent with embodiments of the disclosure. For example, the encoding process 200A can be performed by an encoder. As shown in FIG. 2A, the encoder can encode video sequence 202 into video bitstream 228 according to process 200A. Similar to video sequence 100 in FIG. 1, video sequence 202 can include a set of pictures (referred to as "original pictures") arranged in a temporal order. Similar to structure 110 in FIG. 1, each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions (e.g., regions 114-118) of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can feed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to predicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture (in the forward path) and generate predicted reference 224 for encoding the next original BPU of the original picture (in the reconstruction path). After encoding all original BPSU of the original picture, the encoder can proceed to encode the next picture in video sequence 202.

Referring to process 200A, the encoder can receive video sequence 202 generated by a video capturing device (e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224, and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values (e.g., grayscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder can record only the transform coefficients, from which the decoder can reconstruct residual BPU 210 without receiving the base patterns from the encoder. Compared with residual BPU 210, the transform coefficients can have fewer bits, but they can be used to reconstruct residual BPU 210 without significant quality deterioration. Thus, residual BPU 210 is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214, the encoder can generate quantized transform coefficients 216 by dividing each transform coefficient by an integer value (referred to as a "quantization scale factor") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be lossy. Typically, quantization stage 214 can contribute the most information loss in process 200A. The larger the information loss is, the fewer bits the quantized transform coefficients 216 can need. For obtaining different levels of information loss, the encoder can use different values of the quantization parameter or any other parameter of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 206 and quantized transform coefficients 216, the encoder can encode other information at binary coding stage 226, such as, for example, a prediction mode used at prediction stage 204, parameters of the prediction operation, a transform type at transform stage 212, parameters of the quantization process (e.g., quantization parameters), an encoder control parameter (e.g., a bitrate control parameter), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage. In some embodiments, process 200A can include additional stages. In some embodiments, process 200A can omit one or more stages in FIG. 2A.

FIG. 2B illustrates a schematic diagram of another example encoding process 200B, consistent with embodiments of the disclosure. Process 200B can be modified from process 200A. For example, process 200B can be used by an encoder conforming to a hybrid video coding standard (e.g., H.26x series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPSU in the same picture to predict the target BPU. That is, prediction reference 224 in the spatial prediction can include the neighboring BPSU. The spatial prediction can reduce the inherent spatial redundancy of the picture. Temporal prediction (e.g., an inter-picture prediction or "inter-prediction") can use regions from one or more already coded pictures to predict the target BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044. For example, at spatial prediction stage 2042, the encoder can perform the intra prediction. For an original BPU of a picture being encoded, prediction reference 224 can include one or more neighboring BPSU that have been encoded (in the forward path) and reconstructed (in the reconstructed path) in the same picture. The encoder can generate predicted BPU 208 by extrapolating the neighboring BPSU. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 208. The neighboring BPSU used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPSU, sizes of the used neighboring BPSU, parameters of the extrapolation, a direction of the used neighboring BPSU with respect to the original BPU, or the like.

For another example, at temporal prediction stage 2044, the encoder can perform the inter-prediction. For an original BPU of a target picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 222 to predicted BPU 208 to generate a reconstructed BPU. When all reconstructed BPSU of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the target picture. For example, the search window can be centered at a location having the same coordinates in the reference picture as the original BPU in the target picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the target picture are temporally separated in the timeline (e.g., as shown in FIG. 1), it can be deemed that the matching region "moves" to the location of the original BPU as time goes by. The encoder can record the direction and distance of such a motion as a "motion vector." When multiple reference pictures are used (e.g., as picture 106 in FIG. 1), the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter-prediction, prediction data 206 can include, for example, locations (e.g., coordinates) of the matching region, the motion vectors associated with the matching region, the number of reference pictures, weights associated with the reference pictures, or the like.

For generating predicted BPU 208, the encoder can perform an operation of "motion compensation." The motion compensation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the target picture. When multiple reference pictures are used (e.g., as picture 106 in FIG. 1), the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter-prediction can be unidirectional or bidirectional. Unidirectional inter-predictions can use one or more reference pictures in the same temporal direction with respect to the target picture. For example, picture 104 in FIG. 1 is a unidirectional inter-predicted picture, in which the reference picture (i.e., picture 102) precedes picture 104. Bidirectional inter-predictions can use one or more reference pictures at both temporal directions with respect to the target picture. For example, picture 106 in FIG. 1 is a bidirectional inter-predicted picture, in which the reference pictures (i.e., pictures 104 and 108) are at both temporal directions with respect to picture 104.

Still referring to the forward path of process 200B, after spatial prediction stage 2042 and temporal prediction stage 2044, at mode decision stage 230, the encoder can select a prediction mode (e.g., one of the intra prediction or the inter-prediction) for the current iteration of process 200B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 208 and predicted data 206.

In the reconstruction path of process 200B, if intra prediction mode has been selected in the forward path, after generating prediction reference 224 (e.g., the target BPU that has been encoded and reconstructed in the target picture), the encoder can directly feed prediction reference 224 to spatial prediction stage 2042 for later usage (e.g., for extrapolation of a next BPU of the target picture). The encoder can feed prediction reference 224 to loop filter stage 232, at which the encoder can apply a loop filter to prediction reference 224 to reduce or eliminate distortion (e.g., blocking artifacts) introduced during coding of the prediction reference 224. The encoder can apply various loop filter techniques at loop filter stage 232, such as, for example, deblocking, sample adaptive offsets ("SAO"), adaptive loop filters, or the like. The loop-filtered reference picture can be stored in buffer 234 (or "decoded picture buffer") for later use (e.g., to be used as an inter-prediction reference picture for a future picture of video sequence 202). The encoder can store one or more reference pictures in buffer 234 to be used at temporal prediction stage 2044. In some embodiments, the encoder can encode parameters of the loop filter (e.g., a loop filter strength) at binary coding stage 226, along with quantized transform coefficients 216, prediction data 206, and other information.

Figure 3A:
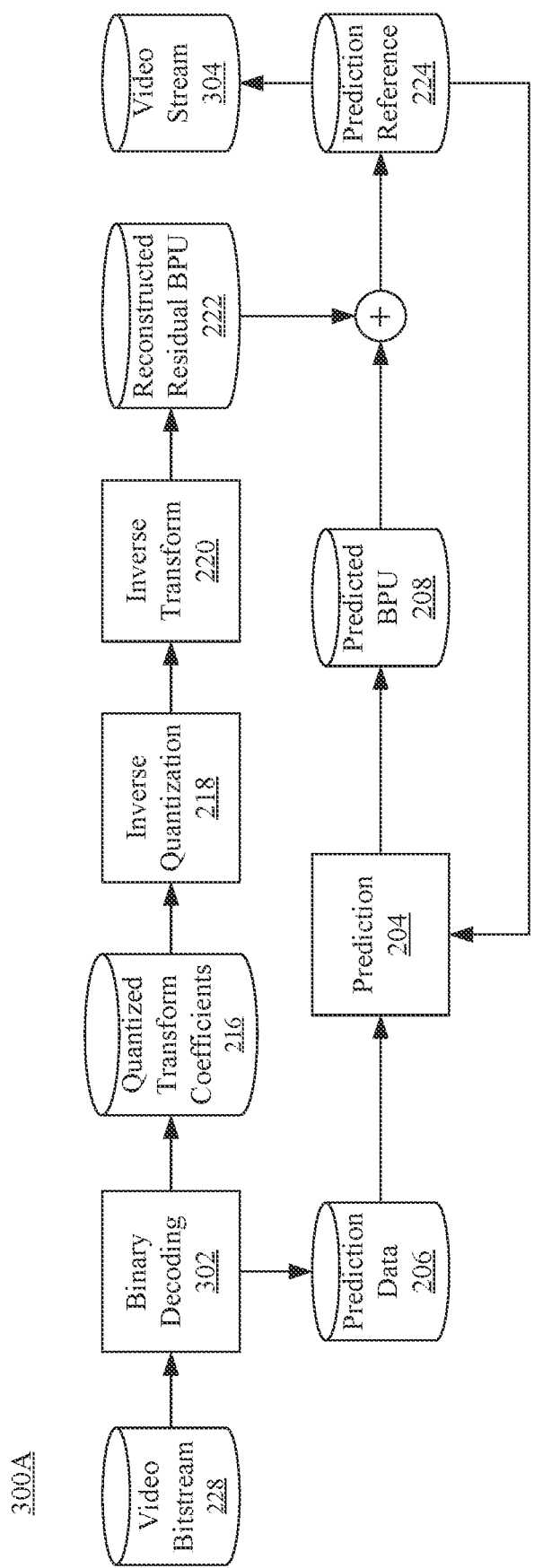
FIG. 3A illustrates a schematic diagram of an example decoding process of a hybrid video coding system, consistent with embodiments of the disclosure.

FIG. 3A illustrates a schematic diagram of an example decoding process 300A, consistent with embodiments of the disclosure. Process 300A can be a decompression process corresponding to the compression process 200A in FIG. 2A. In some embodiments, process 300A can be similar to the reconstruction path of process 200A. A decoder can decode video bitstream 228 into video stream 304 according to process 300A. Video stream 304 can be very similar to video sequence 202. However, due to the information loss in the compression and decompression process (e.g., quantization stage 214 in FIGS. 2A-2B), generally, video stream 304 is not identical to video sequence 202. Similar to processes 200A and 200B in FIGS. 2A-2B, the decoder can perform process 300A at the level of basic processing units (BPSU)

for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions (e.g., regions 114-118) of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transform stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer in a computer memory). The decoder can feed predicted reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPSU of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 206 and quantized transform coefficients 216, the decoder can decode other information at binary decoding stage 302, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 228 is transmitted over a network in packets, the decoder can depacketize video bitstream 228 before feeding it to binary decoding stage 302.

Figure 3B:
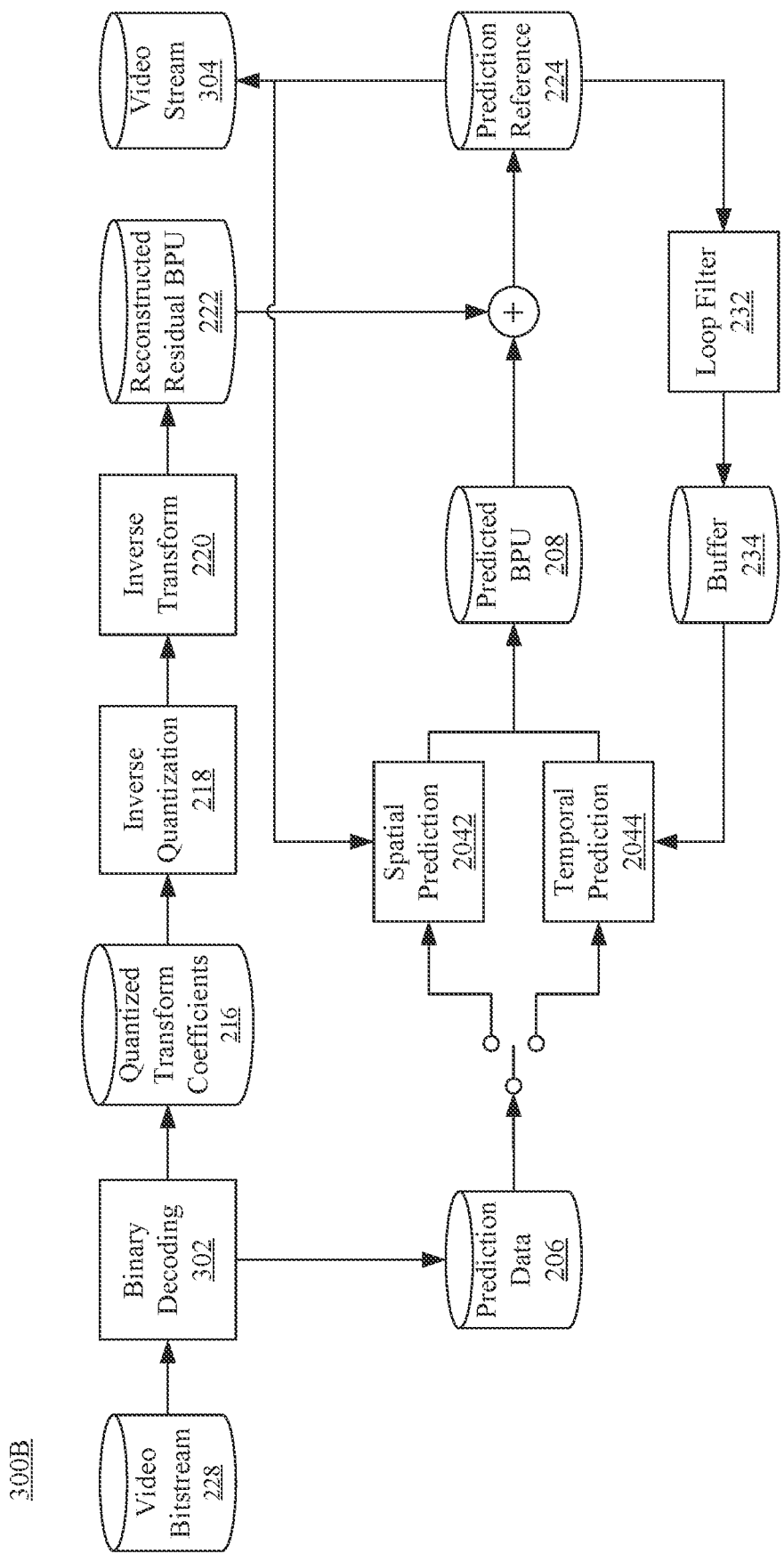
FIG. 3B illustrates a schematic diagram of another example decoding process of a hybrid video coding system, consistent with embodiments of the disclosure.

FIG. 3B illustrates a schematic diagram of another example decoding process 300B, consistent with embodiments of the disclosure. Process 300B can be modified from process 300A. For example, process 300B can be used by a decoder conforming to a hybrid video coding standard (e.g., H.26x series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "target BPU" or "target BPU") of an encoded picture (referred to as a "current picture" or "target picture") that is being decoded, prediction data 206 decoded from binary decoding stage 302 by the decoder can include various types of data, depending on what prediction mode was used to encode the target BPU by the encoder. For example, if intra prediction was used by the encoder to encode the target BPU, prediction data 206 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPSU used as a reference, sizes of the neighboring BPSU, parameters of extrapolation, a direction of the neighboring BPSU with respect to the original BPU, or the like. For another example, if inter-prediction was used by the encoder to encode the target BPU, prediction data 206 can include a prediction mode indicator (e.g., a flag value) indicative of the inter-prediction, parameters of the inter-prediction operation, or the like. The parameters of the inter-prediction operation can include, for example, the number of reference pictures associated with the target BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter-prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the target BPU is decoded using the intra prediction at spatial prediction stage 2042, after generating prediction reference 224 (e.g., the decoded target BPU), the decoder can directly feed prediction reference 224 to spatial prediction stage 2042 for later usage (e.g., for extrapolation of a next BPU of the target picture). If the target BPU is decoded using the inter-prediction at temporal prediction stage 2044, after generating prediction reference 224 (e.g., a reference picture in which all BPSU have been decoded), the decoder can feed prediction reference 224 to loop filter stage 232 to reduce or eliminate distortion (e.g., blocking artifacts). The decoder can apply a loop filter to prediction reference 224, in a way as described in FIG. 2B. The loop-filtered reference picture can be stored in buffer 234 (e.g., a decoded picture buffer in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, prediction data can further include parameters of the loop filter (e.g., a loop filter strength). In some embodiments, when the prediction mode indicator of prediction data 206 indicates that inter-prediction was used to encode the target BPU.

Figure 4:
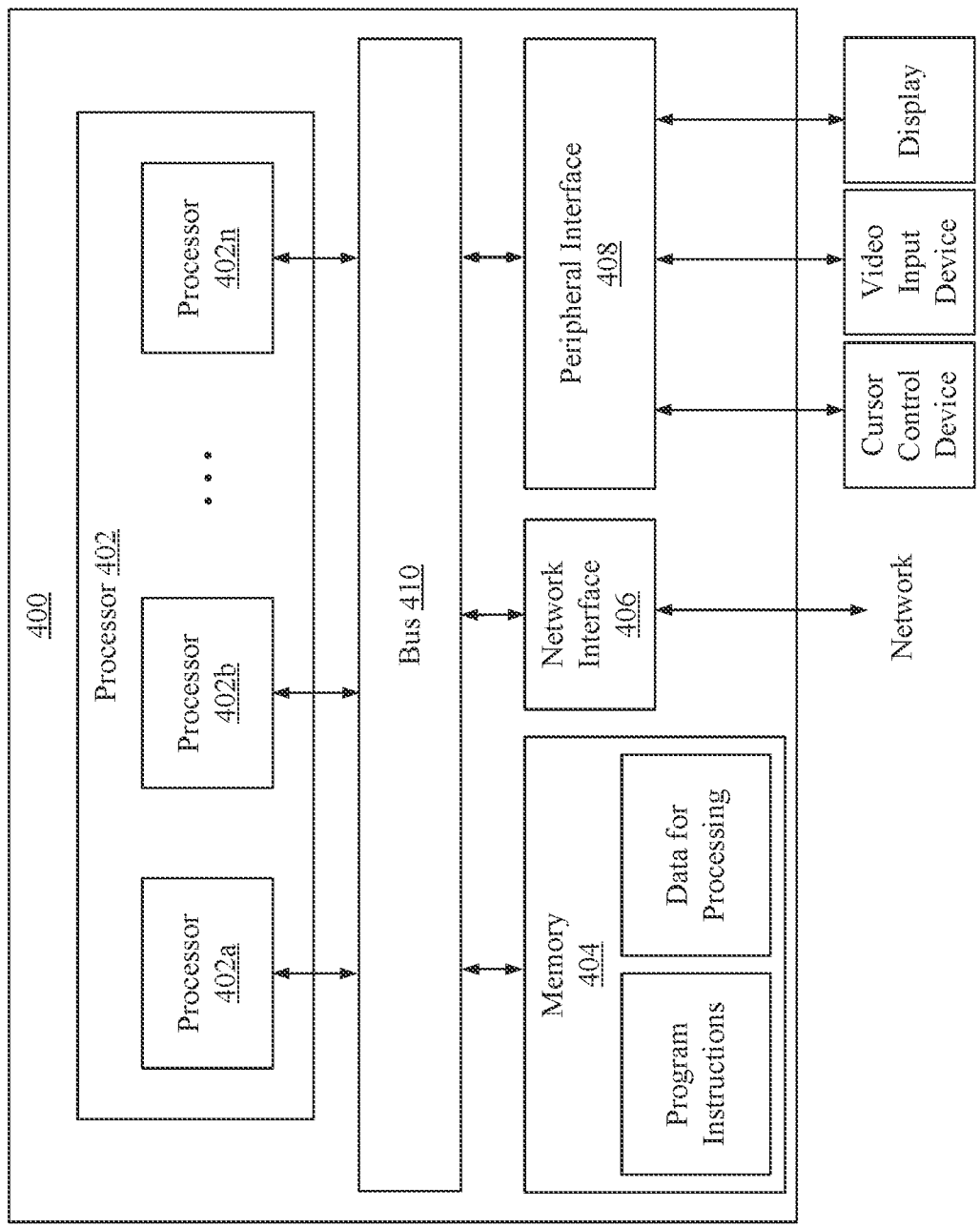
FIG. 4 illustrates a block diagram of an example apparatus for encoding or decoding a video, consistent with some embodiments of this disclosure.

FIG. 4 is a block diagram of an example apparatus 400 for encoding or decoding a video, consistent with embodiments of the disclosure. As shown in FIG. 4, apparatus 400 can include processor 402. When processor 402 executes instructions described herein, apparatus 400 can become a specialized machine for video encoding or decoding. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402a, processor 402b, and processor 402n.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in processes 200A, 200B, 300A, or 300B) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, a near-field communication ("NFC") adapter, a cellular network chip, or the like.

In some embodiments, optionally, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface communicatively coupled to a video archive), or the like.

It should be noted that video codecs (e.g., a codec performing process 200A, 200B, 300A, or 300B) can be implemented as any combination of any software or hardware modules in apparatus 400. For example, some or all stages of process 200A, 200B, 300A, or 300B can be implemented as one or more software modules of apparatus 400, such as program instructions that can be loaded into memory 404. For another example, some or all stages of process 200A, 200B, 300A, or 300B can be implemented as one or more hardware modules of apparatus 400, such as a specialized data processing circuit (e.g., an FPGA, an ASIC, an NPU, or the like).

In the quantization and inverse quantization functional blocks (e.g., quantization 214 and inverse quantization 218 of FIG. 2A or FIG. 2B, inverse quantization 218 of FIG. 3A or FIG. 3B), a quantization parameter (QP) is used to determine the amount of quantization (and inverse quantization) applied to the prediction residuals. Initial QP values used for coding of a picture or slice can be signaled at the high level, for example, using init_qp_minus26 syntax element in the Picture Parameter Set (PPS) and using slice_qp_delta syntax element in the slice header. Further, the QP values can be adapted at the local level for each CU using delta QP values sent at the granularity of quantization groups.

A third generation of the Audio Video coding Standard ("AVS") family, referred to as "AVS3," are a successor of issued first and second generations of the AVS family ("AVS1" and "AVS2"). A skip mode and a direct mode are two special inter-prediction modes in AVS3. In the skip mode or direct mode, motion information (e.g., including a reference index or a motion vector difference) is not signaled in a bitstream received by a decoder but derived at the decoder with the same rules as an encoder sending the bitstream. The skip mode or the direct mode can share the same motion information derivation rule, and the only difference between them is that the skip mode skips the signaling of residuals by setting the residuals to be zero. Compared with normal inter-prediction modes, the skip mode or the direct mode can reduce bits dedicated to the motion information on condition that the encoder follows a specified rule to derive the motion information to perform inter-prediction. In some embodiments, the encoder can derive the motion information based on a spatial or temporal neighboring basic processing unit ("BPU") of a target BPU, and the skip mode or the direct mode can increase coding efficiency in cases when the motion information of the target BPU is close to the motion information of the spatial or temporal neighboring BPU. BPU can be a coding unit or a prediction unit in AVS3, or a temporal motion information storage unit or a spatial motion information storage unit in AVS3.

For example, to derive the motion information used in inter-prediction in the skip mode or the direct mode, the encoder can derive a list of motion candidates and then select one of them to perform inter-prediction. A motion candidate, as used herein, can refer to a combination of motion information. For example, a motion candidate can be a combination of a motion vector and a reference index associated with a reference picture list. The encoder can signal an index of a selected candidate in the encoded bitstream. In the decoder side, the decoder can derive the same list of motion candidates, parse the index of the selected candidate from the bitstream, reconstruct the motion information for the inter-prediction using the parsed index, and perform the inter-prediction using the reconstructed motion information.

Some video coding standards (e.g., AVS3) currently use 12 candidates in the list of motion candidates associated with a target BPU of a target picture. The first candidate is a temporal motion vector predictor (TMVP) that is derived from motion information of a collocated BPU in a reference picture of the target BPU, in which the collocated BPU covers a samp the same location in the reference picture as the target BPU in the target picture. The reference picture can be a reference with a reference index being 0 in a first reference picture list (referred to as "list0") for a P-picture or in a second reference picture list (referred to as "list1") for a B-picture. When the motion information of the collocated BPU is unavailable, a motion vector predictor (MVP) that is derived based on motion information of one or more spatial neighboring BPSU can be used as the TMVP. In some video coding standards (e.g., AVS3), the second, third, and fourth candidates of the list of motion candidates associated with the target BPU of the target picture are spatial motion vector predictors (SMVP) derived from five neighboring BPSU.

Figure 5:
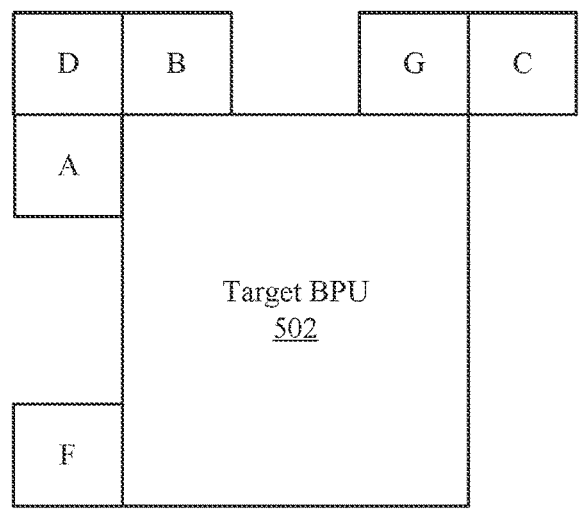
FIG. 5 illustrates example neighboring basic processing units (BPSU) of a target BPU for deriving a spatial motion vector predictor (SMVP), consistent with some embodiments of the disclosure.

By way of example, FIG. 5 illustrates example neighboring BPSU (including BPSU F, G, C, B, A, and D) of a target BPU 502 for deriving a spatial motion vector predictor (SMVP), consistent with some embodiments of the disclosure. The second, third, and fourth candidates of a list of motion candidates associated with target BPU 502 can be derived from BPSU F, G, C, B, A, and D as shown in FIG. 5. The second candidate can be a bi-prediction candidate. The third candidate can be a uni-prediction candidate with its reference picture in list0. The fourth candidate can be a uni-prediction candidate with its reference picture in list1. The second, third, and fourth candidates can be set as first available motion information of six neighboring BPSU (e.g., BPSU F, G, C, B, A, and D) in a specified order.

In some video coding standards (e.g., AVS3), motion vector angular predictor (MVAP) candidates are after SMVP in the motion candidate list. There are at most five MVAP candidates that are derived by angular prediction in five different directions from motion information (referred to as "reference motion information" herein) of the neighboring subblocks. For example, the reference motion information can include a motion vector associated with a neighboring subblock (referred to as a "reference motion vector" or a "reference MV" herein). Motion information prediction can be applied to basic processing sub-units (BPSUs) within the target BPU, in which the MVAP candidate can be a BPSU level candidate. Different BPSUs within the target BPU can be associated with different motion information (e.g., reference MVs).

Figure 6:
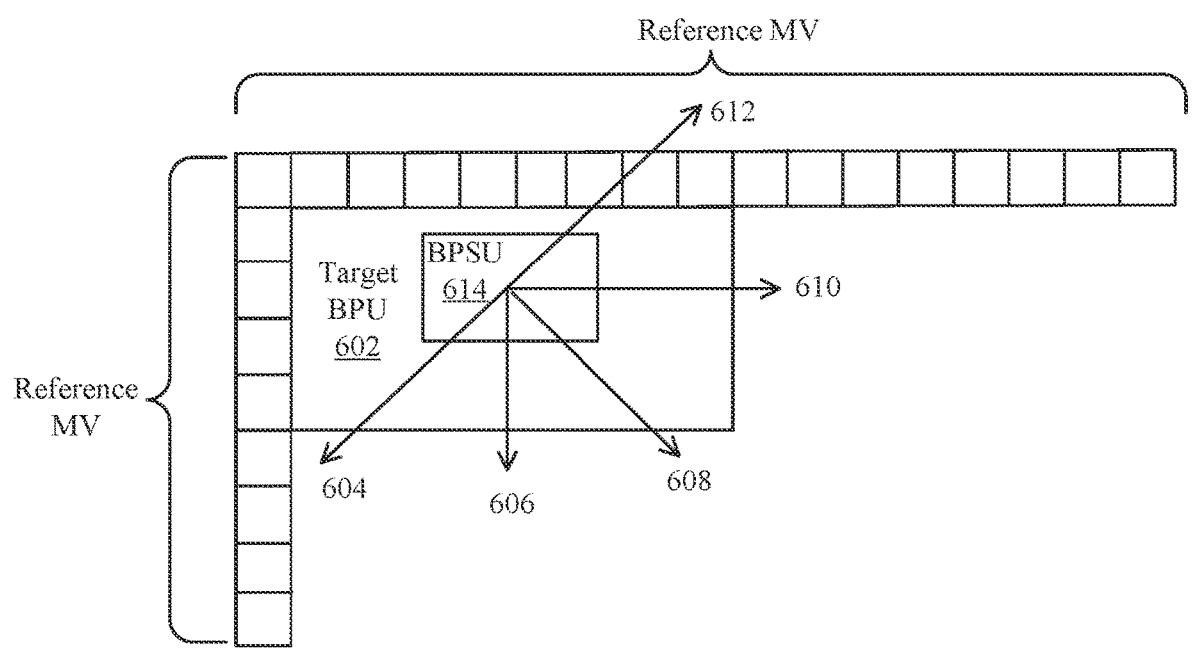
FIG. 6 illustrates five example prediction directions of a motion vector angular predictor (MVAP), consistent with some embodiments of the disclosure.

By way of example, FIG. 6 illustrates five example prediction directions 604, 606, 608, 610, and 614 of an MVAP associated with a target BPU 602, consistent with some embodiments of the disclosure. A video coder (e.g., a video encoder in FIGS. 2A-2B or a video decoder in FIGS. 3A-3B) can check whether reference motion information (e.g., a reference MV and a reference index) associated with a neighboring subblock (e.g., a m×n block, such as 4×4 block) of a target BPU 602 is available). If a neighboring m×n block of BPU 602 is not associated with any reference motion information, the m×n block can be associated with reference motion information (e.g., a reference MV and a reference index) of its neighboring m×n block.

The video coder can further compare reference motion information (e.g., reference MVs) associated with different neighboring m×n blocks in FIG. 6 to determine whether any of prediction directions 604, 606, 608, 610, and 612 is allowed to be used to perform motion information prediction to derive the MVAP candidate. If one or more of directions 604, 606, 608, 610, and 612 are allowed, they can be used to predict motion information associated with a BPSU 616 (e.g., having a block size of p×q, such as 8×8) within target BPU 602. In such a case, the number of MVAP candidates can range from 0 to 5. Motion information prediction can be applied to each p×q BPSU within target BPU 602, and the MVAP candidate can be a BPSU level candidate.

In some video coding standards (e.g., AVS3), after determining MVAP candidates, a video coder (e.g., a video encoder in FIGS. 2A-2B or a video decoder in FIGS. 3A-3B) can determine History-based Motion Vector predictor (HMVP) to fill the list of motion candidates associated with the target BPU of the target picture under the skip mode or direct mode until the number of motion candidates in the list reaches to 12. HMVP can be derived from motion information of previously encoded or decoded BPSU.

In some embodiments, after encoding or decoding an inter-predicted BPU, the video coder can insert motion information of the inter-predicted BPU as the last entry (e.g., a motion candidate) of a HMVP table. For example, when inserting a new entry to the HMVP table, a first-in-first-out (FIFO) rule can be utilized, such as a constrained FIFO rule in which the video coder can first perform redundancy check to determine whether any existing entry in the HMVP table is identical to the new entry. For example, the video coder can perform the redundancy check on the HMVP table from the last entry to the first entry. In some embodiments, if an existing entry in the HMVP table is identical to the new entry, the video coder can move the existing entry to be the last entry of the HMVP table and skip inserting the new entry.

The motion candidates in the HMVP table can be used as HMVP candidates for the skip or the direct mode in a process (referred to as a "pruning" process) described below. In the pruning process, if a motion candidate in the HMVP table is not identical to any TMVP candidate or SMVP candidate in the list of motion candidates under the skip mode or the direct mode, the video coder can insert the motion candidate in the HMVP table as a HMVP candidate into the list of motion candidates under the skip mode or the direct mode. If a motion candidate in the HMVP table is identical to a TMVP candidate or an SMVP candidate, the video coder can skip inserting the motion candidate into the list of motion candidates under the skip mode or the direct mode. The video coder can perform the pruning process to motion candidates in the HMVP table one by one until the list of motion candidates under the skip mode or the direct mode is full. If the video coder performs the pruning process to all motion candidates in the HMVP tables but the list of motion candidates under the skip mode or the direct mode is still not full, the video coder can repeatedly insert the last entry of the HMVP table into the list of motion candidates under the skip mode or the direct mode.

As described above, TMVP candidates of a target BPU of a target picture can be derived from motion information of a collocated BPU in a reference picture associated with the target picture. In some embodiments, a position of a top-left corner of the target BPU can be used to determine the collocated BPU. For example, a pixel of the top-left corner of the collocated BPU has the same position in the reference picture as the top-left corner of the target BPU in the target picture, and the video coder can use the motion vector of the collocated BPU to derive a TMVP candidate for the target BPU. However, in some cases, a large BPU in the target picture can correspond to multiple BPSU in the reference picture with different motion information. If only one of the multiple BPSU' motion information is used to derive the TMVP candidate, the derived TMVP candidate can be inaccurate, by which the coding efficiency can be lowered.

Also, in some video coding standards (e.g., AVS3), only motion information (also referred to as "list0 motion information") from the first reference picture list (i.e., list0 as described herein) of the collocated BPU is used, and the motion information (also referred to as "list1 motion information") from the second reference picture list (i.e., list1 as described herein) of the collocated BPU is not used. Not using the list1 motion information can lose potential coding gain.

Embodiments of this disclosure provides technical solutions for the above-described technical problems by deriving TMVP candidates at the BPSU level. In some embodiments, the technical solutions can include at least one of splitting a target BPU into BPSUs, determine a collocated BPU for the target BPU, deriving a TMVP for the target BPU or a BPSU of the target BPU based on whether motion information (e.g., a motion vector) of a collocated BPU of a target BPSU split from the target BPU exists, pruning a HMVP, or applying a block-size restriction to the BPSU-level TMVP derivation. The technical solutions disclosed herein can improve the accuracy of derived TMVP candidates and increase overall coding efficiency.

Consistent with some embodiments of this disclosure, a video coder (e.g., an encoder or a decoder) can split a target BPU (e.g., a CU) in a target picture into multiple BPSUs (e.g., sub-blocks) and derive a TMVP candidate for each BPSU.

In some embodiments, to split the target BPU, the video coder can split the target BPU into a fixed number of BPSUs based on a fixed partitioning pattern.

By way of example, FIGS. 7A-7C illustrate example partitioning patterns for splitting a target BPU into a fixed number of basic processing sub-units (BPSUs), consistent with some embodiments of the disclosure. In FIG. 7A, a BPU with a size M×N can be horizontally split into two M×(N/2) BPSUs. In FIG. 7B, a BPU with a size M×N can be vertically split into two (M/2)×N BPSUs. In FIG. 7C, a BPU with a size M×N can be cross-split into four (M/2)×(N/2) BPSUs.

In some embodiments, to split the target BPU, the video coder can split the target BPU into multiple BPSUs based on a partitioning pattern dependent on a shape of the target BPU. For example, the video coder can split a target BPU with its width greater than its height based on a partitioning pattern having more vertical splits than horizontal splits. In another example, the video coder can split a target BPU with its height greater than its width based on a partitioning pattern having more horizontal splits than vertical splits. As another example, the video coder can split a target BPU with its height equal to its width based on a partitioning pattern having the same number of vertical and horizontal splits.

FIGS. 8A-8E illustrate example partitioning patterns for splitting a target BPU into multiple BPSUs based on a shape of the target BPU, consistent with some embodiments of the disclosure. In FIG. 8A, a BPU with a size M×(4M) can be horizontally split into four M×M BPSUs. In FIG. 8B, a BPU with a size (4M)×M can be vertically split into four M×M BPSUs. In FIG. 8C, a BPU with a size M×M can be cross-split into four (M/2)×(N/2) BPSUs. In FIG. 8D, a BPU with a size M×(2M) can be horizontally split into two M×M BPSUs. In FIG. 8E, a BPU with a size 2M×M can be vertically split into two M×M BPSUs. In the example embodiments illustrated in FIGS. 8A-8E, the number of BPSUs can be varied such that the partitioning pattern can ensure the BPSUs are square.

In some embodiments, to split the target BPU, the video coder can split the target BPU into a fixed number of BPSUs based on a partitioning pattern dependent on the shape of the target BPU.

By way of example, FIGS. 9A-9E illustrate example partitioning patterns for splitting a target BPU into the same number of BPSUs based on a shape of the target BPU, consistent with some embodiments of the disclosure. In FIG. 9A, a BPU with a size M×(4M) can be horizontally split into four M×M BPSUs. In FIG. 9B, a BPU with a size (4M)×M can be vertically split into four M×M BPSUs. In FIG. 9C, a BPU with a size M×M can be cross-split into four (M/2)×(N/2) BPSUs. In FIG. 9D, a BPU with a size (2M)×M can be cross-split into four M×(M/2) BPSUs. In FIG. 9E, a BPU with a size M×(2M) can be cross-split into four (M/2)×M BPSUs. In the example embodiments illustrated in FIGS. 9A-9E, the video coder can split the target BPU into a fixed number of four BPSUs based on a width-height ratio of the target BPU such that a width-height ratio of a BPSU of the four BPSUs can be substantially one (e.g., 0.5, 1, or 2).

Consistent with some embodiments of this disclosure, after splitting the target BPU in the target picture into the multiple BPSUs, a video coder (e.g., an encoder or a decoder) can determine a collocated BPU in a reference picture associated with the target picture for each BPSU within the target BPU and use motion information (e.g., an MV) of the collocated BPU as a base MV to derive a TMVP candidate for the BPSU. In some embodiments, the BPU in the reference picture can be a temporal motion information storage unit covering a position in the reference picture, and the position in the reference picture can be the same as a position of a sample of the target BPU in the target picture. To derive the TMVP candidate, the video coder can determine a first picture distance and a second picture distance, in which the first picture distance is a distance between the target picture and a first reference picture to which the target BPU refers, and the second picture distance is a distance between the reference picture where the collocated BPU is located and a second reference picture to which the collocated BPU refers. After determining the first picture distance and the second picture distance, the video coder can apply an MV scaling operation on the base MV using the first picture distance and the second picture distance.

In some embodiments, to determine the collocated BPU for the BPSU, the video coder can use a top-left position of each BPSU to determine the collocated BPU. For example, the video coder can determine that a BPU in the reference picture includes a sample having the same position as a top-left sample of the BPSU and determine the BPU as the collocated BPU of the BPSU.

By way of example, FIG. 10 illustrates example top-left positions (represented as circles) of BPSUs for determining a collocated BPU in a reference picture for each BPSU, consistent with some embodiments of the disclosure.

In some embodiments, to determine the collocated BPU for the BPSU, the video coder can use a center position of each BPSU to determine the collocated BPU. For example, the video coder can determine that a BPU in the reference picture includes a sample having the same position as a center sample of the BPSU and determine the BPU as the collocated BPU of the BPSU. As an example, for a BPSU with a width of M pixels and a height of N pixels, its top-left position can be represented as a coordinate (x,y), and its center position can be represented as a coordinate (x+M/2, y+N/2), (x+M/2+1, y+N/2+1), (x+M/2+1, y+N/2), or (x+M/2, y+N/2+1).

By way of example, FIG. 11 illustrates example center positions (represented as circles) of BPSUs for determining a collocated BPU in a reference picture for each BPSU, consistent with some embodiments of the disclosure.

In some embodiments, when the target BPU is cross-split into four BPSUs, to determine the collocated BPU for each BPSU, the video coder can use four corner positions of the BPSUs to determine the collocated BPU. The cross-split four BPSUs can include a top-left BPSU, a top-right BPSU, a bottom-left BPSU, and a bottom-right BPSU. For example, the video coder can use a top-left sample of the top-left BPSU to determine its collocated BPU. That is, a BPU in the reference picture covering a sample with the same positon as the top-left sample of the top-left BPSU is determined as the collocated BPU for the top-left BPSU. The video coder can use a top-right sample of the top-right BPSU to determine its collocated BPU. That is, a BPU in the reference picture covering a sample with the same positon as the top-right sample of the top-right BPSU is determined as the collocated BPU for the top-right BPSU. The video coder can use a bottom-left sample of the bottom-left BPSU to determine its collocated BPU. That is, a BPU in the reference picture covering a sample with the same positon as the bottom-left sample of the bottom-left BPSU is determined as the collocated BPU for the bottom-left BPSU. The video coder can use a bottom-right sample of the bottom-right BPSU to determine its collocated BPU. That is, a BPU in the reference picture covering a sample with the same positon as the bottom-right sample of the bottom-right BPSU is determined as the collocated BPU for the bottom-right BPSU.

By way of example, FIG. 12 illustrates example corner positions (represented as circles) of cross-split BPSUs in a target BPU for determining a collocated BPU in a reference picture for each BPSU, consistent with some embodiments of the disclosure.

Consistent with some embodiments of this disclosure, after determining whether the motion information of the collocated BPU exists, a video coder (e.g., an encoder or a decoder) can derive a TMVP of the target BPU or a BPSU based on at least one of the list0 motion information or the list1 motion information associated with the corresponding collocated BPU in the reference picture.

In some embodiments, to derive the TMVP, if the list0 motion information and the list1 motion information of the collocated BPU in the reference picture are both available, the video coder can derive the TMVP for the target BPU or the BPSU based on both of them. If only one of the list0 motion information or the list1 motion information is available, the video coder can derive the TMVP for the target BPU or the BPSU based on the available one. If none of the list0 motion information or the list1 motion information is available, the video coder can derive the TMVP for the target BPU (or the BPSU) based on motion information of a spatial neighboring BPU of the target BPU (or the BPSU) in the same picture.

By way of example, FIG. 13 illustrates Table 1 of example syntax for deriving a TMVP, consistent with some embodiments of this disclosure. In Table 1, "MV0" (or referred to as "list0 MV") represents a motion vector associated with a reference picture in the first reference picture list (e.g., list0 as described herein). "MV1" (or referred to as "list1 MV") represents a motion vector associated with a reference picture in the second reference picture list (e.g., list1 as described herein). In Table 1, "reference index 0" represents a reference index of a reference picture in the first reference picture list (e.g., list0), and "reference index 1" represents a reference index of a reference picture in the second reference picture list (e.g., list1). In Table 1, a reference index 0 being equal to or greater than 0 represents that the list0 motion information is available, and a reference index 1 being equal to or greater than 1 represents that the list1 motion information is available.

In some embodiments, to derive the TMVP, the video coder can assign a higher priority value to one of the list0 motion information or the list1 motion information, and assign a lower priority value to the other one of the list0 motion information or the list1 motion information. For ease of explanation without losing generality, in an example, the video coder can assign the list0 motion information with a first priority value and assign the list1 motion information with a second priority value, in which the first priority value is higher than the second priority value. If the list0 motion information of the collocated BPU in the reference picture is available, the video coder can derive the TMVP of the target BPU or BPSU based on only the list0 motion information regardless of the availability of the list1 motion information. If the list0 motion information is unavailable, then the video coder can check whether the list1 motion information is available. If the list1 motion information is available, the video coder can derive the TMVP of the target BPU or BPSU based on the list1 motion information. Otherwise, if the list1 motion information is also unavailable, the video coder can derive the TMVP for the target BPU (or the BPSU) based on motion information of a spatial neighboring BPU of the target BPU (or the BPSU) in the same picture.

By way of example, FIG. 14 illustrates Table 2 of example syntax for a second method of deriving a TMVP, consistent with some embodiments of this disclosure. In Table 2, "MV0" (or referred to as "list0 MV") represents a motion vector associated with a reference picture in the first reference picture list (e.g., list0). "MV1" (or referred to as "list1 MV") represents a motion vector associated with a reference picture in the second reference picture list (e.g., list1). In Table 2, "reference index 0" represents a reference index of a reference picture in the first reference picture list (e.g., list0), and "reference index 1" represents a reference index of a reference picture in the second reference picture list (e.g., list1). In Table 2, a reference index 0 being equal to or greater than 0 represents that the list0 motion information is available, and a reference index 1 being equal to or greater than 1 represents that the list1 motion information is available.

Consistent with some embodiments of this disclosure, a video coder (e.g., an encoder or a decoder) can determine whether motion information (e.g., a motion vector) of a collocated BPU of a target BPSU split from the target BPU exists. The video coder can then derive the TMPV based on whether the motion information of the collocated BPU exists. If the motion information (e.g., a MV) of the collocated BPU of the target BPSU is available, the video coder can use the MV of the collocated BPU as a base MV for deriving a TMVP of the target BPSU. If the motion information (e.g., a MV) of the collocated BPU of the target BPSU is unavailable, the video coder can invoke another process for deriving the TMVP of the target BPSU to ensure that the TMVP of the target BPSU always exists.

In some embodiments, if motion information of the collocated BPU of the target BPSU is unavailable, the video coder can use a BPU-level TMVP candidate as the TMVP for the BPSU. For example, the video coder can determine the TMVP for the BPSU as the TMVP of the BPU. By way of example, the video coder can determine a collocated BPU in the reference picture with reference index being 0 from the second reference picture list (e.g., list 1) for a B-picture or from the first reference picture list (e.g., list 0) for a P-picture, in which the collocated BPU covers a sample having the same positon as the top-left sample of the target BPU in the current picture. The video coder can use the list0 motion information of the collocated BPU to derive the TMVP of the target BPU. When the motion information of the collocated BPU is unavailable, a motion vector predictor (MVP) derived based on motion information of one or more spatial neighboring BPSUs or BPUs can be used as the TMVP of the target BPU. The derived TMVP of the target BPU can be used as the TMVP for the target BPSU when the motion information of the collocated BPU of the target BPSU is unavailable.

In some video coding standards (e.g., AVS3), the BPU-level TMVP candidate can be always available because the video coder can use a spatial-neighbor based MVP as the BPU-level TMVP candidate when the collocated BPU (e.g., a collocated block) of the BPU is unavailable.

In some embodiments, if the motion information of the collocated BPU of the target BPSU is unavailable, the video coder can determine whether motion information of a collocated BPU of a neighboring BPSU is available. If the motion information of the collocated BPU of the neighboring BPSU is available, the video coder can use the MV of the collocated BPU of the neighboring BPSU as a base MV for deriving the TMVP for the current BPSU. Otherwise, if the motion information of the collocated BPU of the neighboring BPSU is unavailable, the video coder can use a BPU-level (e.g., a CU-level) TMVP candidate as the TMVP for the target BPSU.

By way of example, with reference to FIG. 7C, a BPU with a size M×N can be cross-split into four (M/2)×(N/2) BPSUs. The cross-split four BPSUs can include a top-left BPSU, a top-right BPSU, a bottom-left BPSU, and a bottom-right BPSU. The target BPSU can be a first BPSU (e.g., one of the top-left BPSU, the top-right BPSU, the bottom-left BPSU, or the bottom-right BPSU) in FIG. 7C. A neighboring BPSU of the first BPSU can be a second BPSU (e.g., another one of the top-left BPSU, the top-right BPSU, the bottom-left BPSU, or the bottom-right BPSU) in FIG. 7C. The video coder can derive the TMVP for the first BPSU as follows. If motion information (e.g., a MV) of a collocated BPU of the first BPSU is unavailable, the video coder can determine whether motion information (e.g., a MV) of a collocated BPU of the second BPSU is available. If the motion information of the collocated BPU of the second BPSU is available, the video coder can use a MV of the collocated BPU of the second BPSU as a base MV for deriving the TMVP for the first BPSU. Otherwise, if the motion information of the collocated BPU of the second BPSU is unavailable, the video coder can use a BPU-level (e.g., a CU-level) TMVP candidate as the TMVP for the first BPSU.

The above-described first BPSU and second BPSU can have various combinations. In some embodiments, the first BPSU and the second BPSU can be horizontally neighbouring BPSUs. For example, the first BPSU can be the top-left BPSU, and the second BPSU can be the top-right BPSU. In another example, the first BPSU can be the top-right BPSU, and the second BPSU can be the top-left BPSU. In yet another example, the first BPSU can be the bottom-left BPSU, and the second BPSU can be the bottom-right BPSU. In yet another example, the first BPSU can be the bottom-right BPSU, and the second BPSU can be the bottom-left BPSU.

In some embodiments, the first BPSU and the second BPSU can be vertically neighbouring BPSUs. For example, the first BPSU can be the top-left BPSU, and the second BPSU can be the bottom-left BPSU. In yet another example, the first BPSU can be the top-right BPSU, and the second BPSU can be the bottom-right BPSU. In yet another example, the first BPSU can be the bottom-left BPSU, and the second BPSU can be the top-left BPSU. In yet another example, the first BPSU can be the bottom-right BPSU, and the second BPSU can be the top-right BPSU.

In some embodiments, the first BPSU and the second BPSU can be diagonally neighbouring BPSUs. For example, the first BPSU can be the top-left BPSU, and the second BPSU can be the bottom-right BPSU. In yet another example, the first BPSU can be the top-right BPSU, and the second BPSU can be the bottom-left BPSU. In yet another example, the first BPSU can be the bottom-left BPSU, and the second BPSU can be the top-right BPSU. In yet another example, the first BPSU can be the bottom-right BPSU, and the second BPSU can be the top-left BPSU.

In some embodiments, the first BPSU and the second BPSU can be neighbouring BPSUs along a clockwise direction (also referred to as "clockwise neighboring BPSUs"). For example, the first BPSU can be the top-left BPSU, and the second BPSU can be the top-right BPSU. In yet another example, the first BPSU can be the top-right BPSU, and the second BPSU can be the bottom-right BPSU. In yet another example, the first BPSU can be the bottom-right BPSU, and the second BPSU can be the bottom-left BPSU. In yet another example, the first BPSU can be the bottom-left BPSU, and the second BPSU can be the top-left BPSU.

In some embodiments, the first BPSU and the second BPSU can be neighbouring BPSUs along a counterclockwise direction (also referred to as "counterclockwise neighboring BPSUs"). For example, the first BPSU can be the top-left BPSU, and the second BPSU can be the bottom-left BPSU. In yet another example, the first BPSU can be the bottom-left BPSU, and the second BPSU can be the bottom-right BPSU. In yet another example, the first BPSU can be the bottom-right BPSU, and the second BPSU can be the top-right BPSU.

In some embodiments, the video coder can derive the TMVP for a target BPSU as follows. If motion information (e.g., a MV) of a collocated BPU of the target BPSU is unavailable, the video coder can determine whether motion information (e.g., a MV) of a collocated BPU of a first neighbouring BPSU is available. If the motion information of the collocated BPU of the first neighbouring BPSU is still unavailable, the video coder can determine whether motion information (e.g., a MV) of a collocated BPU of a second neighbouring BPSU is available. If the motion information of the collocated BPU of the second neighbouring BPSU is still unavailable, the video coder can repeat the above-described process for other neighbouring BPSUs of the target BPSU until determining that none of the neighbouring BPSUs of the target BPSU has a collocated BPU with available motion information. If none of the neighbouring BPSUs of the target BPSU has a collocated BPU with available motion information, the video coder can use a BPU-level (e.g., a CU-level) TMVP candidate as the TMVP for the first BPSU.

In some embodiments, to find available motion information, the video coder can apply the above-described iterative process on all neighbouring BPSUs of the target BPSU in accordance with an order. In some embodiments, the order can be represented as a table (e.g., a look-up table). The video coder can use motion information of a collocated BPU of a determined neighbouring BPSU to derive the TMVP for the target BPSU, and the determined neighbouring BPSU is dependent on availability of each neighbouring BPSU.

By way of example, FIG. 15 illustrates Table 3 for determining a neighboring BPSU of a target BPSU, consistent with some embodiments of this disclosure. Table 3 includes all different combinations of availabilities of all neighboring BPSUs of the target BPSU, in which motion information of a collocated BPU of one of the neighboring BPSUs can be used to derive the TMVP for the target BPSU. Table 3 can represent an order (e.g., a top-down order) in accordance with which the video coder can apply the above-described iterative process on all neighbouring BPSUs of the target BPSU.

The BPSUs in Table 3 are represented as indices. In Table 3, with reference to FIG. 7C, "Sb0" represents the top-left BPSU, "Sb1" represents the top-right BPSU, "Sb2" represents the bottom-left BPSU, and "Sb3" represents the bottom-right BPSU. The left four columns of Table 3 represent the availabilities of the motion information of the collocated BPU of Sb0 through Sb3, in which a value "1" represents being available and a value "0" represents being unavailable. The right four columns of Table 3 represent the BPSUs (e.g., Sb0 through Sb3) with each cell including a BPSU index, in which the motion information of a collocated BPU of each BPSU is used for derivation of the TMVP of the target BPSU. In the right four columns of Table 3, values "0," "1," "2," and "3" represent using motion information of the collocated BPU of "Sb0," "Sb1," "Sb2," and "Sb3," respectively, to derive the TMVP for the target BPSU. A value "BPU" represents using a BPU-level (e.g., a CU-level) TMVP candidate as the TMVP for the target BPSU.

In some embodiments, to find available motion information, the video coder can apply the above-described iterative process on some but not all neighbouring BPSUs of the target BPSU in accordance with an order. For example, the video coder can input availability statuses of each BPSU of a target BPU into Table 3, and then determine an index of a BPSU for the target BPSU from Table 3, in which the motion information of the collocated BPU of the determined BPSU can be used for the derivation of the TMVP of the target BPSU.

As previously described, in some video coding standards (e.g., AVS3), during HMVP candidate pruning, when the video coder inserts a HMVP candidate into a list of motion candidates under the skip mode or the direct mode, the video coder can check candidates in the HMVP table one by one from the last entry to the first entry. If a candidate in the HMVP table is not identical to any TMVP candidate or SMVP candidate in the list of motion candidates under the skip mode or the direct mode, the video coder can insert the candidate in the HMVP table as a HMVP candidate into the list of motion candidates under the skip mode or the direct mode. If a candidate in the HMVP table is identical to one of a TMVP candidate or an SMVP candidate in the list of motion candidates under the skip mode or the direct mode, the video coder can skip inserting the candidate into the list of motion candidates under the skip mode or the direct mode. However, when the BPU-level TMVP candidate is replaced with BPSU level TMVP candidate, it is inefficient to keep checking candidates in the HMVP table by comparing them with BPSU-level TMVP candidates because a BPU-level TMVP candidate (e.g., an HMVP candidate) is not identical to any BPSU-level TMVP candidate.

Consistent with some embodiments of this disclosure, a video coder (e.g., an encoder or a decoder) can perform HMVP candidate pruning by skip comparing a candidate in the HMVP table with BPSU-level TMVP candidates when inserting a candidate in the HMVP table to the list of motion candidates under the skip mode or the direct mode.

In some embodiments, the video coder can skip comparing a candidate in the HMVP table with BPSU-level TMVP candidates under all conditions.

In some embodiments, the video coder can first compare motion information (e.g., a motion vector or a reference index associated with the motion vector) of each BPSU. If the motion information of each BPSU is the same (represented as a symbol "MI"), the video coder can then compare MI with a candidate in the HMVP table. After that, the video coder can insert the candidate in the HMVP table to the list of motion candidates under the skip mode or the direct mode only when the candidate is different from MI. If the motion information of each BPSU is not the same, the video coder can skip comparing the candidate in the HMVP table with BPSU-level TMVP candidates before inserting the candidate in the HMVP table to the list of motion candidates under the skip mode or the direct mode.

In some embodiments, to simplify comparing the motion information of each BPSU, the video coder can compare motion information of only some of the BPSUs. By way of example, with reference to FIG. 7C, when a BPU is cross-split into four BPSUs, if the motion information (represented as a symbol "MI") of the top-left BPSU is the same as the motion information of the bottom-right BPSU, the video coder can compare MI with the candidate in the HMVP table. After that, the video coder can insert the candidate in the HMVP table to the list of motion candidates under the skip mode or the direct mode only when the candidate is different from MI. If the motion information of the top-left BPSU is different from the motion information of the bottom-right BPSU, the video coder can skip comparing the candidate in the HMVP table with BPSU-level TMVP candidates before inserting the candidate in the HMVP table to the list of motion candidates under the skip mode or the direct mode.

As previously described, after encoding or decoding an inter-predicted BPU, the video coder can insert the motion information as the last entry of an HMVP table if the motion information is not identical to any candidate pre-existing in the HMVP table. In some video coding standards (e.g., AVS3), the motion information of the top-left BPSU can be used to update the HMVP. For a BPU-level TMVP candidate or an SMVP candidate, because all the BPSUs (e.g., sub-blocks) within a BPU (e.g., a CU) can have the same motion information, any BPSU of the BPU can be used to update the HMVP table. However, when the BPU-level TMVP candidate is replaced with a BPSU-level TMVP, different BPSUs can have different motion information. Typically, BPSUs in the right part or bottom part of a BPU can be closer to the BPU to be coded next. In such cases, using the top-left BPSU to update the HMVP table can be inefficient.

Consistent with some embodiments of this disclosure, a video coder (e.g., an encoder or a decoder) can update the HMVP table using motion information of a BPSU on a right boundary, a bottom boundary, or a bottom-right corner of a BPU.

In some embodiments, only for a BPSU-level TMVP candidate, the video coder can update the HMVP table using the motion information of the BPSU on a bottom-right corner, a top-right corner, or a bottom-left corner of the BPU. In some embodiments, for both a BPSU-level TMVP candidate and an MVAP candidate, the video coder can update the HMVP table using the motion information of the BPSU on the bottom-right corner, the top-right corner, or the bottom-left corner of the BPU. In some embodiments, for all motion candidates under the skip mode or the direct mode, the video coder can update the HMVP table using the motion information of the BPSU on the bottom-right corner, the top-right corner, or the bottom-left corner of the BPU.

Typically, to reduce the bandwidth of hardware implantation, the video coder can apply restriction on the minimum BPU size for motion compensation. When using a BPSU-level TMVP, the unit for the motion compensation can be changed from a BPU to a BPSU. Consistent with some embodiments of this disclosure, a video coder (e.g., an encoder or a decoder) can restrict a size of a BPU (also referred to as a "BPU size") for a BPSU-level TMVP candidate.

In some embodiments, the video coder can only enable BPSU-level TMVPs for a BPU with all of its BPSUs larger than or equal to a threshold size. By way of example, with reference to FIG. 7C, when a BPU is split into four BPSUs, the video coder can set the minimum block size for motion compensation as M×M (e.g., M can be 4, 8 or 16), and only enable determining TMVP for a BPSU when both a width and a height of a BPU is greater than or equal to 2M. In some embodiments, when the width or the height is smaller than 2M, BPSU-level TMVP can be disabled, and BPU-level TMVP can be enabled instead.

In some embodiments, the video coder can split a BPU into multiple BPSUs based on the block size restriction, in which a partitioning pattern of such split and the number of the split BPSUs can be unfixed (e.g., not predetermined). For example, the video coder can split a BPU into multiple BPSUs only when at least one of the width of the BPSU or the height of the BPSU is greater than or equal to a threshold value.

Figure 16A:
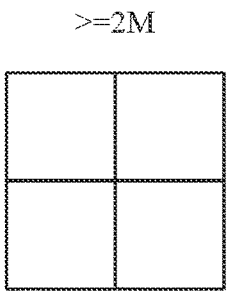
FIGS. 16A-16E illustrate example BPSU partitioning patterns under a BPU size restriction, consistent with some embodiments of the disclosure.
Figure 16B:
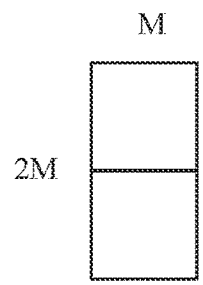
Figure 16C:
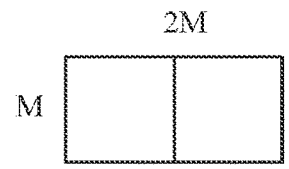
Figure 16D:
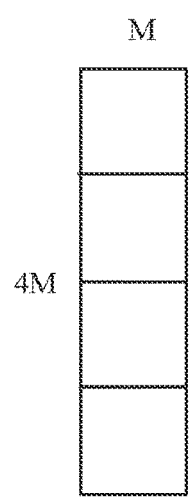
Figure 16E:
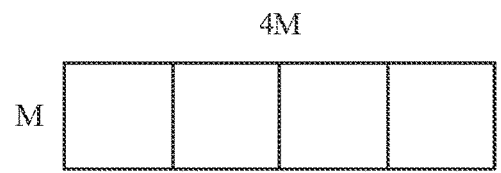

By way of example, FIGS. 16A-16E illustrate example BPSU partitioning patterns under a BPU size restriction, consistent with some embodiments of the disclosure. In FIGS. 16A-16E, the minimum BPU size for motion compensation is set to be M×M. FIG. 16A illustrates that a BPU with a size larger than 2M×2M is cross-split into four BPSUs. FIG. 16B illustrates that a BPU with a size equal to M×2M is horizontally split into two M×M BPSUs. FIG. 16C illustrates that a BPU with a size equal to 2M×M is vertically split into two M×M BPSUs. FIG. 16D illustrates that a BPU with a size equal to M×4M is horizontally split into four M×M BPSUs. FIG. 16CE illustrates that a BPU with a size equal to 4M×M is vertically split into four M×M BPSUs. For a BPU with a size equal smaller than 2M×2M (not shown in FIGS. 16A-16E), the video coder can disable BPSU-level TMVP derivation.

Figure 17:
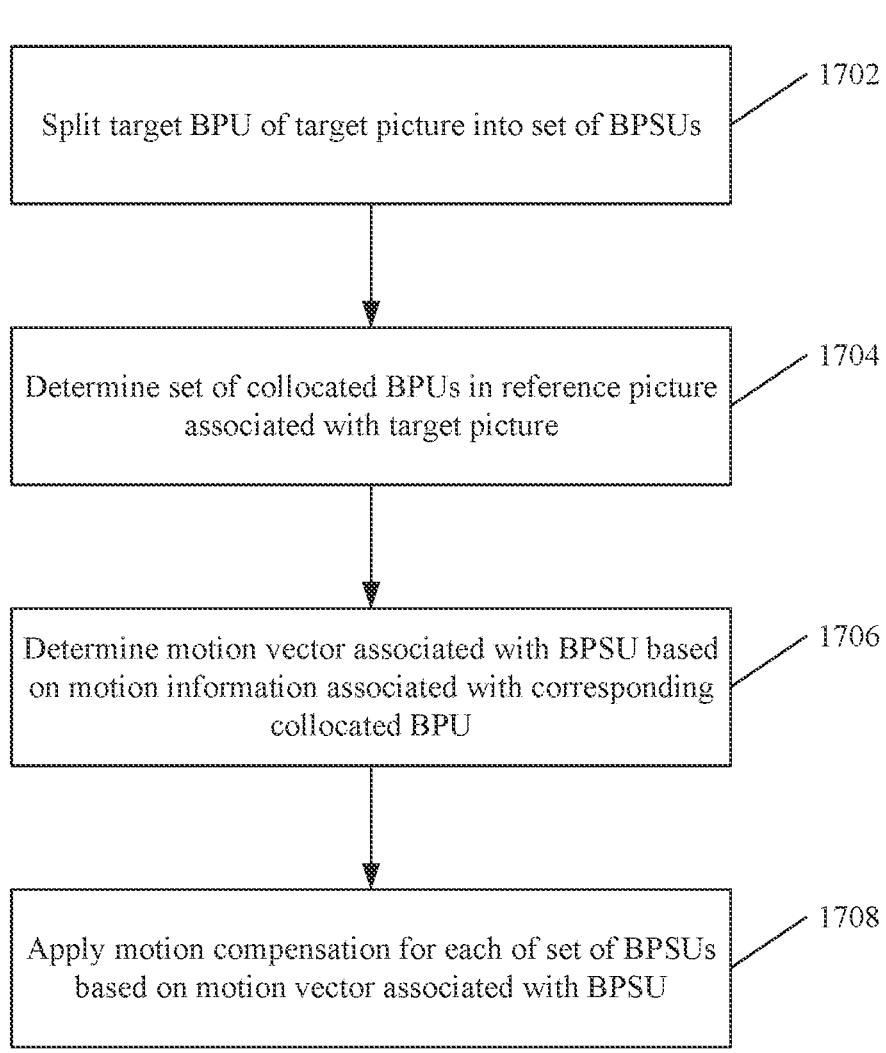
FIG. 17 illustrates a flowchart of an example process for video processing, according to some embodiments of this disclosure.

Consistent with some embodiments of this disclosure, FIG. 17 illustrates a flowchart of an example process 1700 for video processing, according to some embodiments of this disclosure. In some embodiments, process 1700 can be performed by a video codec (e.g., an encoder in FIGS. 2A-2B or a decoder in FIGS. 3A-3B). For example, the codec can be implemented as one or more software or hardware components of an apparatus (e.g., apparatus 400 in FIG. 4) for controlling a coding mode of encoding or decoding a video sequence, such as one or more processors (e.g., processor 402) of the apparatus.

At step 1702, the apparatus can split a target basic processing unit (BPU) of a target picture into a set of basic processing sub-units (BPSUs). For example, the apparatus can split the target BPU into the set of BPSUs in a manner as described in association with FIG. 7A-7C, 8A-8E, or 9A-9E.

In some embodiments, the apparatus can split the target BPU into a fixed number of BPSUs in accordance with a fixed partitioning pattern. In some embodiments, to split the target BPU, the apparatus can split the target BPU into a fixed number of BPSUs in accordance with a partitioning pattern, in which the partitioning pattern can include a substantially square grid. For example, a width-height ratio of a BPSU split from the target BPU can be substantially one (e.g., 0.5, 1, or 2).

In some embodiments, to split the target BPU, the apparatus can split the target BPU into four BPSUs in accordance with a cross pattern, in which a width of each of the four BPSUs can be a half of a width of the target BPU, and a height of each of the four BPSU can be a half of a height of the target BPU. For example, the four BPSUs can include a top-left BPSU, a top-right BPSU, a bottom-left BPSU, and a bottom-right BPSU. By way of example, the apparatus can split the target BPU in a manner as described in association with FIG. 7C.

In some embodiments, the apparatus can split the target BPU into a non-fixed number of BPSUs. For example, in response to a width of the BPU being greater than a height of the BPU (e.g., a case as described in association with FIG. 8B or 8E), the apparatus can split the target BPU into the set of BPSUs in accordance with a first partitioning pattern, in which the first partitioning pattern can include more vertical splits than horizontal splits. In another example, in response to the width of the BPU being smaller than the height of the BPU (e.g., a case as described in association with FIG. 8A or 8D), the apparatus can split the target BPU into the set of BPSUs in accordance with a second partitioning pattern, in which the second partitioning pattern can include fewer vertical splits than horizontal splits. As another example, in response to the width of the BPU being equal to the height of the BPU (e.g., a case as described in association with FIG. 8C), the apparatus can split the target BPU into the set of BPSUs in accordance with a third partitioning pattern, in which the third partitioning pattern can include the same vertical splits as horizontal splits.

In some embodiments, to split the target BPU, the apparatus can apply a block size restriction (e.g., as described in association with FIGS. 16A-16E). For example, the apparatus can determine at least one of whether a width of the target BPU is greater than or equal to a first threshold value (e.g., M pixels) or whether a height of the target BPU is greater than or equal to a second threshold value (e.g., N pixels). The apparatus can then split the target BPU into the set of BPSUs based on at least one of a determination that the width of the target BPU is greater than or equal to the first threshold value or a determination that the height of the target BPU is greater than or equal to the second threshold value.

Still referring to FIG. 17, at step 1704, the apparatus can determine a set of collocated BPUs in a reference picture associated with the target picture. A BPSU of the set of BPSUs can correspond to a collocated BPU of the set of collocated BPUs.

In some embodiments, to determine the set of collocated BPUs, the apparatus can determine a location coordinate of a portion of the BPSU in the target picture. The apparatus can then determine the collocated BPU as a BPU covering a sample having the same location coordinate in the reference picture. For example, the portion of the BPSU can be one of a corner portion or a center portion. The corner portion can include one of a top-left portion, a top-right portion, a bottom-left portion, or a bottom-right portion. By way of example, the apparatus can determine the set of collocated BPUs in a manner as described in association with FIGS. 10-12.

In some embodiments, when the target BPU is split into the set of BPSUs including a first BPSU, a second BPSU, a third BPSU, and a fourth BPSU, to determine the set of collocated BPUs, the apparatus can determine, in the target picture, a first location coordinate of a top-left corner of the first BPSU, a second location coordinate of a top-right corner of the second BPSU, a third location coordinate of a bottom-left corner of the third BPSU, and a fourth location coordinate of a bottom-right corner of the fourth BPSU. Then, the apparatus can determine a first collocated BPU as a BPU covering a sample having the first location coordinate in the reference picture, a second collocated BPU as a BPU covering a sample having the second location coordinate in the reference picture, a third collocated BPU as a BPU covering a sample having the third location coordinate in the reference picture, and a fourth collocated BPU as a BPU covering a sample having the fourth location coordinate in the reference picture.

In some embodiments, when the target BPU is split into four BPSUs including a top-left BPSU, a top-right BPSU, a bottom-left BPSU, and a bottom-right BPSU in accordance with a cross pattern, to determine the set of collocated BPUs, the apparatus can determine, in the target picture, a first location coordinate of a top-left portion of the top-left BPSU, a second location coordinate of a top-right portion of the top-right BPSU, a third location coordinate of a bottom-left portion of the bottom-left BPSU, and a fourth location coordinate of a bottom-right portion of the bottom-right BPSU. Then, the apparatus can determine a first collocated BPU corresponding to the top-left BPSU as a BPU covering a sample having the first location coordinate in the reference picture, a second collocated BPU corresponding to the top-right BPSU as a BPU covering a sample having the second location coordinate in the reference picture, a third collocated BPU corresponding to the bottom-left BPSU as a BPU covering a sample having the third location coordinate in the reference picture, and a fourth collocated BPU corresponding to the bottom-right BPSU as a BPU covering a sample having the fourth location coordinate in the reference picture.

At step 1706, the apparatus can determine a motion vector associated with the BPSU based on motion information associated with the corresponding collocated BPU. In some embodiments, the motion information can include at least one of a motion vector, a reference index associated with the motion vector, or a motion vector difference associated with the motion vector.

In some embodiments, to determine the motion vector, the apparatus can determine a first picture distance and a second picture distance. The first picture distance can be a distance between the target picture and a first reference picture the target BPU referring to. The second picture distance can be a distance between the reference picture (e.g., the reference picture where the collocated BPU locates) and a second reference picture the collocated BPU referring to. Then, the apparatus can determine the motion vector associated with the BPSU by applying a motion vector scaling operation on the motion information associated with the corresponding collocated BPU based on the first picture distance and the second picture distance.

In some embodiments, to determine the motion vector, in response to the motion information associated with the corresponding collocated BPU being unavailable, the apparatus can determine the motion vector associated with the BPSU as a motion vector associated with the target BPU at a BPU level.

In some embodiments, to determine the motion vector, in response to the motion information associated with the corresponding collocated BPU being unavailable, the apparatus can determine the motion vector based on motion information of a spatial neighboring BPSU of the BPSU. In response to the motion information of the spatial neighboring BPSU being unavailable, the apparatus can determine the motion vector associated with the BPSU as a motion vector associated with the target BPU at a BPU level. By way of example, with reference to the descriptions in association with FIG. 7C, the spatial neighboring BPSU can include one of a horizontally neighboring BPSU, a vertically neighboring BPSU, a diagonally neighboring BPSU, a clockwise neighboring BPSU, or a counterclockwise neighboring BPSU.

In some embodiments, to determine the motion vector, the apparatus can determine whether motion information of a first spatial neighboring BPSU of the BPSU is available. Based on a determination that the motion information of the first spatial neighboring BPSU of the BPSU is unavailable, the apparatus can select a second spatial neighboring BPSU of the BPSU in accordance with at least one of a predetermined order or availability statuses (e.g., as shown and described in association with FIG. 15) of neighboring BPSUs of the BPSU. Then, the apparatus can determine whether motion information of the second spatial neighboring BPSU is available. Based on a determination that the motion information of the second spatial neighboring BPSU is available, the apparatus can determine the motion vector based on the motion information of the second spatial neighboring BPSU.

Still referring to FIG. 17, at step 1708, the apparatus can apply motion compensation for each of the set of BPSUs based on the motion vector associated with the BPSU.

Consistent with some embodiments of this disclosure, besides performing the operations in steps 1702-1708, the apparatus can further disable determining whether an entry of a history-based motion vector predictor (HMVP) table is identical to a temporal motion vector predictor (TMVP) candidate of the list of motion candidates. Then, the apparatus can determine whether an entry of the HMVP table is identical to a spatial motion vector predictor (SMVP) candidate of the list motion candidate. In response to the entry of the HMVP table is not identical to any SMVP candidate of the list motion candidate, the apparatus can insert the entry of the HMVP table into the list of motion candidates.

In some embodiments, to disable determining whether the entry of the HMVP table is identical to the TMVP candidate of the list of motion candidates, the apparatus can determine whether first motion information of a first BPSU of the set of BPSUs is identical to second motion information of a second BPSU of the set of BPSUs. Based on a determination that the first motion information is not identical to the second motion information, the apparatus can disable determining whether the entry of the HMVP table is identical to the TMVP candidate of the list of motion candidates. Based on a determination that the first motion information is identical to the second motion information, the apparatus can determine whether the entry of the HMVP table is identical to the first motion information or the second motion information. Based on a determination that the entry of the HMVP table is not identical to the first motion information or the second motion information, the apparatus can insert the entry of the HMVP table into the list of motion candidates.

Consistent with some embodiments of this disclosure, besides performing the operations in steps 1702-1708, the apparatus can further update a history-based motion vector predictor (HMVP) table using motion information of a BPSU on a right boundary, on a bottom boundary, or at a bottom-right corner of the target BPU. In some embodiments, before updating the HMVP table, the apparatus can determine whether the target BPU is coded with a skip mode or a direct mode. In response to the target BPU is coded with the skip mode or the direct mode, the apparatus can update the HMVP table using the motion information of the BPSU on the right boundary, on the bottom boundary, or at the bottom-right corner of the target BPU.

Consistent with some embodiments of this disclosure, besides performing the operations in steps 1702-1708, the apparatus can further determine whether at least one of first motion information of the collocated BPU associated with a first reference picture list (e.g., list0) or second motion information of the collocated BPU associated with a second reference picture list (e.g., list1) is available, in which the first reference picture list and the second reference picture list can be associated with the reference picture. For example, the first reference picture list can be associated with P-pictures, the first reference picture and the second reference picture can be associated with B-pictures. Based on a determination that at least one of the first motion information or the second motion information is available, the apparatus can determine the motion vector associated with the BPSU based on at least one of the first motion information or the second motion information.

In some embodiments, based on a determination that none of the first motion information or the second motion information is available, the apparatus can determine the motion vector associated with the BPSU based on motion information of a spatial neighboring BPU or BPSU of the target BPU, or can determine the motion vector associated with the BPSU as a motion vector associated with the target BPU at a BPU level. By way of example, the apparatus can determine the motion vector associated with the BPSU in a manner as described in association with FIG. 13.

In some embodiments, to determine the motion vector associated with the BPSU based on at least one of the first motion information or the second motion information, in response to the first motion information and the second motion information being available, the apparatus can determine the motion vector associated with BPSU based on the first motion information and the second motion information. In response to the first motion information being available and the second motion information being unavailable, the apparatus can determine the motion vector associated with the BPSU based on the first motion information. In response to the first motion information being unavailable and the second motion information being available, the apparatus can determine the motion vector associated with the BPSU based on the second motion information. By way of example, the apparatus can determine the motion vector associated with the BPSU in a manner as described in association with FIG. 14.

In some embodiments, to determine the motion vector associated with the BPSU based on at least one of the first motion information or the second motion information, in response to the first motion information being available, the apparatus can determine the motion vector associated with the BPSU based on the first motion information. In response to the first motion information being unavailable, the apparatus can determine whether the second motion information is available. Based on a determination that the second motion information is available, the apparatus can determine the motion vector associated with the BPSU based on the second motion information.

Figure 18:
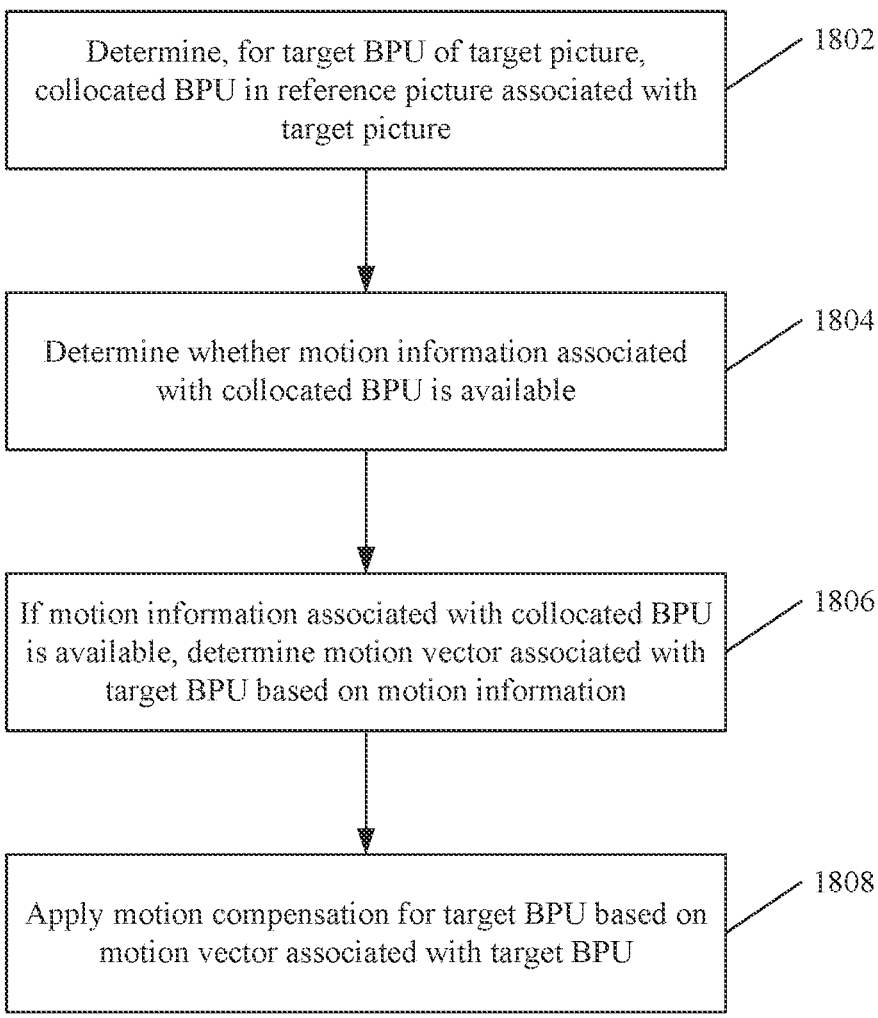
FIG. 18 illustrates a flowchart of another example process for video processing, according to some embodiments of this disclosure.

Consistent with some embodiments of this disclosure, FIG. 18 illustrates a flowchart of an example process 1800 for video processing, according to some embodiments of this disclosure. In some embodiments, process 1800 can be performed by a video codec (e.g., an encoder in FIGS. 2A-2B or a decoder in FIGS. 3A-3B). For example, the codec can be implemented as one or more software or hardware components of an apparatus (e.g., apparatus 400 in FIG. 4) for controlling a coding mode of encoding or decoding a video sequence, such as one or more processors (e.g., processor 402) of the apparatus.

At step 1802, the apparatus can determine, for a target basic processing unit (BPU) of a target picture, a collocated BPU in a reference picture associated with the target picture. The reference picture can be a B-picture.

At step 1804, the apparatus can determine whether motion information associated with the collocated BPU is available. For example, the motion information can include at least one of a motion vector, a reference index associated with the motion vector, or a motion vector difference associated with the motion vector.

At step 1806, based on a determination that the motion information associated with the collocated BPU is available, the apparatus can determine a motion vector associated with the target BPU based on the motion information.

At step 1808, the apparatus can apply motion compensation for the target BPU based on the motion vector associated with the target BPU.

Consistent with some embodiments of this disclosure, the motion information associated with the collocated BPU at steps 1802-1808 can be first motion information associated with a first reference picture list that is associated with the reference picture. The apparatus can further determine whether second motion information associated with a second reference picture list associated with the reference picture is available. Based on a determination that at least one of the first motion information or the second motion information is available, the apparatus can determine the motion vector associated with the target BPU based on at least one of the first motion information or the second motion information. Based on a determination that none of the first motion information or the second motion information is available, the apparatus can determine the motion vector associated with the target BPU based on motion information of a spatial neighboring BPU or BPSU of the target BPU, or determining the motion vector associated with the BPSU as a motion vector associated with the target BPU at a BPU level.

In some embodiments, to determine the motion vector associated with the target BPU based on at least one of the first motion information or the second motion information, in response to the first motion information and the second motion information being available, the apparatus can determine the motion vector associated with the target BPU based on the first motion information and the second motion information. In response to the first motion information being available and the second motion information being unavailable, the apparatus can determine the motion vector associated with the target BPU based on the first motion information. In response to the first motion information being unavailable and the second motion information being available, the apparatus can determine the motion vector associated with the target BPU based on the second motion information.

In some embodiments, to determine the motion vector associated with the target BPU based on at least one of the first motion information or the second motion information, in response to the first motion information being available, the apparatus can determine the motion vector associated with the target BPU based on the first motion information.

In response to the first motion information being unavailable, the apparatus can determine whether the second motion information is available. Based on a determination that the second motion information is available, the apparatus can determine the motion vector associated with the target BPU based on the second motion information.

Consistent with some embodiments of this disclosure, besides performing the operations in steps 1802-1808, the apparatus can further split the target BPU into a set of basic processing sub-units (BPSUs). The apparatus can then determine a set of collocated BPUs in the reference picture, in which a BPSU of the set of BPSUs corresponds to a collocated BPU of the set of collocated BPUs. Then, the apparatus can determine a motion vector associated with the BPSU based on motion information associated with the corresponding collocated BPU of the set of collocated BPUs. After that, the apparatus can apply motion compensation for each of the set of BPSUs based on the motion vector associated with the BPSU.

In some embodiments, a non-transitory computer-readable storage medium including instructions is also provided, and the instructions can be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device can include one or more processors (CPUs), an input/output interface, a network interface, and/or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a component can include A or B, then, unless specifically stated otherwise or infeasible, the component can include A, or B, or A and B. As a second example, if it is stated that a component can include A, B, or C, then, unless specifically stated otherwise or infeasible, the component can include A, or B, or C, or A and B, or A and C, or B and C, or A and B and C.

It is appreciated that the above described embodiments can be implemented by hardware, or software (program codes), or a combination of hardware and software. If implemented by software, it can be stored in the above-described computer-readable media. The software, when executed by the processor can perform the disclosed methods. The computing units and other functional units described in the present disclosure can be implemented by hardware, or software, or a combination of hardware and software. One of ordinary skill in the art can also understand that multiple ones of the above described modules/units can be combined as one module/unit, and each of the above described modules/units can be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the disclosure disclosed herein. It is intended that the specification and examples be considered as example only, with a true scope and spirit of the disclosure being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

The embodiments can further be described using the following clauses:

1. A non-transitory computer-readable medium storing a set of instructions that is executable by at least one processor of an apparatus to cause the apparatus to perform a method, the method comprising:

splitting a target basic processing unit (BPU) of a target picture into a set of basic processing sub-units (BPSUs);

determining a set of collocated BPUs in a reference picture associated with the target picture, wherein a BPSU of the set of BPSUs corresponds to a collocated BPU of the set of collocated BPUs;

determining a motion vector associated with the BPSU based on motion information associated with the corresponding collocated BPU; and applying motion compensation for each of the set of BPSUs based on the motion vector associated with the BPSU.

2. The non-transitory computer-readable medium of clause 1, wherein splitting the target BPU of the target picture into the set of BPSUs comprises:

splitting the target BPU into a fixed number of BPSUs in accordance with a fixed partitioning pattern.

3. The non-transitory computer-readable medium of clause 1, wherein splitting the target BPU of the target picture into the set of BPSUs comprises:

in response to a width of the BPU being greater than a height of the BPU, splitting the target BPU into the set of BPSUs in accordance with a first partitioning pattern, wherein the first partitioning pattern comprises more vertical splits than horizontal splits;

in response to the width of the BPU being smaller than the height of the BPU, splitting the target BPU into the set of BPSUs in accordance with a second partitioning pattern, wherein the second partitioning pattern comprises fewer vertical splits than horizontal splits; and in response to the width of the BPU being equal to the height of the BPU, splitting the target BPU into the set of BPSUs in accordance with a third partitioning pattern, wherein the third partitioning pattern comprises the same vertical splits as horizontal splits.

4. The non-transitory computer-readable medium of clause 1, wherein splitting the target BPU of the target picture into the set of BPSUs comprises:

splitting the target BPU into a fixed number of BPSUs in accordance with a partitioning pattern, wherein the partitioning pattern comprises a substantially square grid.

5. The non-transitory computer-readable medium of clause 1, wherein splitting the target BPU of the target picture into the set of BPSUs comprises:

splitting the target BPU into four BPSUs in accordance with a cross pattern, wherein a width of each of the four BPSUs is a half of a width of the target BPU, and a height of each of the four BPSUs is a half of a height of the target BPU.

6. The non-transitory computer-readable medium of clause 5, wherein the four BPSUs comprise a top-left BPSU, a top-right BPSU, a bottom-left BPSU, and a bottom-right BPSU, and wherein determining the set of collocated BPUs comprises:

determining, in the target picture, a first location coordinate of a top-left portion of the top-left BPSU, a second location coordinate of a top-right portion of the top-right BPSU, a third location coordinate of a bottom-left portion of the bottom-left BPSU, and a fourth location coordinate of a bottom-right portion of the bottom-right BPSU; and determining a first collocated BPU as a BPU covering a sample having the first location coordinate in the reference picture, a second collocated BPU as a BPU covering a sample having the second location coordinate in the reference picture, a third collocated BPU as a BPU covering a sample having the third location coordinate in the reference picture, and a fourth collocated BPU as a BPU covering a sample having the fourth location coordinate in the reference picture.

7. The non-transitory computer-readable medium of clause 1, wherein splitting the target BPU of the target picture into the set of BPSUs comprises:

determining at least one of whether a width of the target BPU is greater than or equal to a first threshold value or whether a height of the target BPU is greater than or equal to a second threshold value;

splitting the target BPU into the set of BPSUs based on at least one of a determination that the width of the target BPU is greater than or equal to the first threshold value or a determination that the height of the target BPU is greater than or equal to the second threshold value.

8. The non-transitory computer-readable medium of clause 1, wherein determining the set of collocated BPUs comprises:

determining a location coordinate of a portion of the BPSU in the target picture; and determining the collocated BPU as a BPU covering a sample having the location coordinate in the reference picture.

9. The non-transitory computer-readable medium of clause 8, wherein the portion of the BPSU comprises one of a corner portion or a center portion, and wherein the corner portion comprises one of a top-left portion, a top-right portion, a bottom-left portion, or a bottom-right portion.

10. The non-transitory computer-readable medium of clause 8, wherein the set of BPSUs comprises a first BPSU, a second BPSU, a third BPSU, and a fourth BPSU, and wherein determining the set of collocated BPUs comprises:

determining, in the target picture, a first location coordinate of a top-left corner of the first BPSU, a second location coordinate of a top-right corner of the second BPSU, a third location coordinate of a bottom-left corner of the third BPSU, and a fourth location coordinate of a bottom-right corner of the fourth BPSU; and determining a first collocated BPU as a BPU covering a sample having the first location coordinate in the reference picture, a second collocated BPU as a BPU covering a sample having the second location coordinate in the reference picture, a third collocated BPU as a BPU covering a sample having the third location coordinate in the reference picture, and a fourth collocated BPU as a BPU covering a sample having the fourth location coordinate in the reference picture.

11. The non-transitory computer-readable medium of clause 1, wherein determining the motion vector associated with the BPSU based on the motion information associated with the corresponding collocated BPU comprises:

determining a first picture distance and a second picture distance, wherein the first picture distance is a distance between the target picture and a first reference picture the target BPU referring to, and the second picture distance is a distance between the reference picture and a second reference picture the collocated BPU referring to; and determining the motion vector associated with the BPSU by applying a motion vector scaling operation on the motion information associated with the corresponding collocated BPU based on the first picture distance and the second picture distance.

12. The non-transitory computer-readable medium of clause 1, wherein determining the motion vector associated with the BPSU based on the motion information associated with the corresponding collocated BPU comprises:

in response to the motion information associated with the corresponding collocated BPU being unavailable, determining the motion vector associated with the BPSU as a motion vector associated with the target BPU at a BPU level.

13. The non-transitory computer-readable medium of clause 1, wherein determining the motion vector associated with the BPSU based on the motion information associated with the corresponding collocated BPU comprises:

in response to the motion information associated with the corresponding collocated BPU being unavailable, determining the motion vector based on motion information of a spatial neighboring BPSU of the BPSU; and in response to the motion information of the spatial neighboring BPSU being unavailable, determining the motion vector associated with the BPSU as a motion vector associated with the target BPU at a BPU level.

14. The non-transitory computer-readable medium of clause 13, wherein the spatial neighboring BPSU comprises one of a horizontally neighboring BPSU, a vertically neighboring BPSU, a diagonally neighboring BPSU, a clockwise neighboring BPSU, or a counterclockwise neighboring BPSU.

15. The non-transitory computer-readable medium of clause 13, wherein determining the motion vector associated with the BPSU based on the motion information of the spatial neighboring BPSU of the BPSU comprises:

determining whether motion information of a first spatial neighboring BPSU of the BPSU is available;

based on a determination that the motion information of the first spatial neighboring BPSU of the BPSU is unavailable, selecting a second spatial neighboring BPSU of the BPSU in accordance with at least one of a predetermined order or availability statuses of neighboring BPSUs of the BPSU;

determining whether motion information of the second spatial neighboring BPSU is available; and based on a determination that the motion information of the second spatial neighboring BPSU is available, determining the motion vector based on the motion information of the second spatial neighboring BPSU.

16. The non-transitory computer-readable medium of clause 1, wherein the set of instructions that is executable by the at least one processor of the apparatus causes the apparatus to further perform:

disabling determining whether an entry of a history-based motion vector predictor (HMVP) table is identical to a temporal motion vector predictor (TMVP) candidate of the list of motion candidates;

determining whether an entry of the HMVP table is identical to a spatial motion vector predictor (SMVP) candidate of the list motion candidate; and in response to the entry of the HMVP table is not identical to any SMVP candidate of the list motion candidate, inserting the entry of the HMVP table into the list of motion candidates.

17. The non-transitory computer-readable medium of clause 16, wherein disabling determining whether the entry of the HMVP table is identical to the TMVP candidate of the list of motion candidates comprises:

determining whether first motion information of a first BPSU of the set of BPSUs is identical to second motion information of a second BPSU of the set of BPSUs;

based on a determination that the first motion information is not identical to the second motion information, disabling determining whether the entry of the HMVP table is identical to the TMVP candidate of the list of motion candidates;

based on a determination that the first motion information is identical to the second motion information, determining whether the entry of the HMVP table is identical to the first motion information or the second motion information; and based on a determination that the entry of the HMVP table is not identical to the first motion information or the second motion information, inserting the entry of the HMVP table into the list of motion candidates.

18. The non-transitory computer-readable medium of clause 1, wherein the set of instructions that is executable by the at least one processor of the apparatus causes the apparatus to further perform:

updating a history-based motion vector predictor (HMVP) table using motion information of a BPSU on a right boundary, on a bottom boundary, or at a bottom-right corner of the target BPU.

19. The non-transitory computer-readable medium of clause 18, wherein the set of instructions that is executable by the at least one processor of the apparatus causes the apparatus to further perform:

before updating the HMVP table, determining whether the target BPU is coded with a skip mode or a direct mode; and in response to the target BPU is coded with the skip mode or the direct mode, updating the HMVP table using the motion information of the BPSU on the right boundary, on the bottom boundary, or at the bottom-right corner of the target BPU.

20. The non-transitory computer-readable medium of clause 1, wherein the set of instructions that is executable by the at least one processor of the apparatus causes the apparatus to further perform:

determining whether at least one of first motion information of the collocated BPU associated with a first reference picture list or second motion information of the collocated BPU associated with a second reference picture list is available, wherein the first reference picture list and the second reference picture list are associated with the reference picture; and based on a determination that at least one of the first motion information or the second motion information is available, determining the motion vector associated with the BPSU based on at least one of the first motion information or the second motion information.

21. The non-transitory computer-readable medium of clause 20, wherein the set of instructions that is executable by the at least one processor of the apparatus causes the apparatus to further perform:

based on a determination that none of the first motion information or the second motion information is available, determining the motion vector associated with the BPSU based on motion information of a spatial neighboring BPU of the target BPU, or determining the motion vector associated with the BPSU as a motion vector associated with the target BPU at a BPU level.

22. The non-transitory computer-readable medium of clause 20, wherein determining the motion vector associated with the BPSU based on at least one of the first motion information or the second motion information comprises:

in response to the first motion information and the second motion information being available, determining the motion vector associated with the BPSU based on the first motion information and the second motion information;

in response to the first motion information being available and the second motion information being unavailable, determining the motion vector associated with the BPSU based on the first motion information; and in response to the first motion information being unavailable and the second motion information being available, determining the motion vector associated with the BPSU based on the second motion information.

23. The non-transitory computer-readable medium of clause 20, wherein determining the motion vector associated with the BPSU based on at least one of the first motion information or the second motion information comprises:

in response to the first motion information being available, determining the motion vector associated with the BPSU based on the first motion information;

in response to the first motion information being unavailable, determining whether the second motion information is available; and based on a determination that the second motion information is available, determining the motion vector associated with the BPSU based on the second motion information.

24. The non-transitory computer-readable medium of any of clauses 1-23, wherein the motion information comprises at least one of a motion vector, a reference index associated with the motion vector, or a motion vector difference associated with the motion vector.

25. A non-transitory computer-readable medium storing a set of instructions that is executable by at least one processor of an apparatus to cause the apparatus to perform a method, the method comprising:

determining, for a target basic processing unit (BPU) of a target picture, a collocated BPU in a reference picture associated with the target picture, wherein the reference picture is a B-picture;

determining whether motion information associated with the collocated BPU is available;

based on a determination that the motion information associated with collocated BPU is available, determining a motion vector associated with the target BPU based on the motion information; and applying motion compensation for the target BPU based on the motion vector associated with the target BPU.

26. The non-transitory computer-readable medium of clause 25, wherein the motion information associated with the collocated BPU is first motion information associated with a first reference picture list associated with the reference picture, and wherein the set of instructions that is executable by the at least one processor of the apparatus causes the apparatus to further perform:

determining whether second motion information associated with a second reference picture list associated with the reference picture is available, wherein the second reference picture list is associated with the reference picture;

based on a determination that at least one of the first motion information or the second motion information is available, determining the motion vector associated with the target BPU based on at least one of the first motion information or the second motion information; and based on a determination that none of the first motion information or the second motion information is available, determining the motion vector associated with the target BPU based on motion information of a spatial neighboring BPU of the target BPU, or determining the motion vector associated with the target BPU as a motion vector of the target BPU at a BPU level.

27. The non-transitory computer-readable medium of clause 26, wherein determining the motion vector associated with the target BPU based on at least one of the first motion information or the second motion information comprises:

in response to the first motion information and the second motion information being available, determining the motion vector associated with the target BPU based on the first motion information and the second motion information;

in response to the first motion information being available and the second motion information being unavailable, determining the motion vector associated with the target BPU based on the first motion information; and in response to the first motion information being unavailable and the second motion information being available, determining the motion vector associated with the target BPU based on the second motion information.

28. The non-transitory computer-readable medium of clause 26, wherein determining the motion vector associated with the target BPU based on at least one of the first motion information or the second motion information comprises:

in response to the first motion information being available, determining the motion vector associated with the target BPU based on the first motion information;

in response to the first motion information being unavailable, determining whether the second motion information is available; and based on a determination that the second motion information is available, determining the motion vector associated with the target BPU based on the second motion information.

29. The non-transitory computer-readable medium of any of clauses 25-28, wherein the motion information comprises at least one of a motion vector, a reference index associated with the motion vector, or a motion vector difference associated with the motion vector.

30. The apparatus of any of clauses 25-28, wherein the set of instructions that is executable by the at least one processor of the apparatus causes the apparatus to further perform:

splitting the target BPU into a set of basic processing sub-units (BPSUs);

determining a set of collocated BPUs in the reference picture, wherein a BPSU of the set of BPSUs corresponds to a collocated BPU of the set of collocated BPUs;

determining a motion vector associated with the BPSU based on motion information associated with the corresponding collocated BPU of the set of collocated BPUs; and applying motion compensation for each of the set of BPSUs based on the motion vector associated with the BPSU.

31. An apparatus, comprising:

a memory configured to store a set of instructions; and one or more processors communicatively coupled to the memory and configured to execute the set of instructions to cause the apparatus to perform:

splitting a target basic processing unit (BPU) of a target picture into a set of basic processing sub-units (BPSUs);

determining a set of collocated BPUs in a reference picture associated with the target picture, wherein a BPSU of the set of BPSUs corresponds to a collocated BPU of the set of collocated BPUs;

determining a motion vector associated with the BPSU based on motion information associated with the corresponding collocated BPU; and applying motion compensation for each of the set of BPSUs based on the motion vector associated with the BPSU.

32. The apparatus of clause 31, wherein splitting the target BPU of the target picture into the set of BPSUs comprises:

splitting the target BPU into a fixed number of BPSUs in accordance with a fixed partitioning pattern.

33. The apparatus of clause 31, wherein splitting the target BPU of the target picture into the set of BPSUs comprises:

in response to a width of the BPU being greater than a height of the BPU, splitting the target BPU into the set of BPSUs in accordance with a first partitioning pattern, wherein the first partitioning pattern comprises more vertical splits than horizontal splits;

in response to the width of the BPU being smaller than the height of the BPU, splitting the target BPU into the set of BPSUs in accordance with a second partitioning pattern, wherein the second partitioning pattern comprises fewer vertical splits than horizontal splits; and in response to the width of the BPU being equal to the height of the BPU, splitting the target BPU into the set of BPSUs in accordance with a third partitioning pattern, wherein the third partitioning pattern comprises the same vertical splits as horizontal splits.

34. The apparatus of clause 31, wherein splitting the target BPU of the target picture into the set of BPSUs comprises:

splitting the target BPU into a fixed number of BPSUs in accordance with a partitioning pattern, wherein the partitioning pattern comprises a substantially square grid.

35. The apparatus of clause 31, wherein splitting the target BPU of the target picture into the set of BPSUs comprises:

splitting the target BPU into four BPSUs in accordance with a cross pattern, wherein a width of each of the four BPSUs is a half of a width of the target BPU, and a height of each of the four BPSUs is a half of a height of the target BPU.

36. The apparatus of clause 35, wherein the four BPSUs comprise a top-left BPSU, a top-right BPSU, a bottom-left BPSU, and a bottom-right BPSU, and wherein determining the set of collocated BPUs comprises:

determining, in the target picture, a first location coordinate of a top-left portion of the top-left BPSU, a second location coordinate of a top-right portion of the top-right BPSU, a third location coordinate of a bottom-left portion of the bottom-left BPSU, and a fourth location coordinate of a bottom-right portion of the bottom-right BPSU; and determining a first collocated BPU as a BPU covering a sample having the first location coordinate in the reference picture, a second collocated BPU as a BPU covering a sample having the second location coordinate in the reference picture, a third collocated BPU as a BPU covering a sample having the third location coordinate in the reference picture, and a fourth collocated BPU as a BPU covering a sample having the fourth location coordinate in the reference picture.

37. The apparatus of clause 31, wherein splitting the target BPU of the target picture into the set of BPSUs comprises:

determining at least one of whether a width of the target BPU is greater than or equal to a first threshold value or whether a height of the target BPU is greater than or equal to a second threshold value;

splitting the target BPU into the set of BPSUs based on at least one of a determination that the width of the target BPU is greater than or equal to the first threshold value or a determination that the height of the target BPU is greater than or equal to the second threshold value.

38. The apparatus of clause 31, wherein determining the set of collocated BPUs comprises:

determining a location coordinate of a portion of the BPSU in the target picture; and determining the collocated BPU as a BPU covering a sample having the location coordinate in the reference picture.

39. The apparatus of clause 38, wherein the portion of the BPSU comprises one of a corner portion or a center portion, and wherein the corner portion comprises one of a top-left portion, a top-right portion, a bottom-left portion, or a bottom-right portion.

40. The apparatus of clause 38, wherein the set of BPSUs comprises a first BPSU, a second BPSU, a third BPSU, and a fourth BPSU, and wherein determining the set of collocated BPUs comprises:

determining, in the target picture, a first location coordinate of a top-left corner of the first BPSU, a second location coordinate of a top-right corner of the second BPSU, a third location coordinate of a bottom-left corner of the third BPSU, and a fourth location coordinate of a bottom-right corner of the fourth BPSU; and determining a first collocated BPU as a BPU covering a sample having the first location coordinate in the reference picture, a second collocated BPU as a BPU covering a sample having the second location coordinate in the reference picture, a third collocated BPU as a BPU covering a sample having the third location coordinate in the reference picture, and a fourth collocated BPU as a BPU covering a sample having the fourth location coordinate in the reference picture.

41. The apparatus of clause 31, wherein determining the motion vector associated with the BPSU based on the motion information associated with the corresponding collocated BPU comprises:

determining a first picture distance and a second picture distance, wherein the first picture distance is a distance between the target picture and a first reference picture the target BPU referring to, and the second picture distance is a distance between the reference picture and a second reference picture the collocated BPU referring to; and determining the motion vector associated with the BPSU by applying a motion vector scaling operation on the motion information associated with the corresponding collocated BPU based on the first picture distance and the second picture distance.

42. The apparatus of clause 31, wherein determining the motion vector associated with the BPSU based on the motion information associated with the corresponding collocated BPU comprises:

in response to the motion information associated with the corresponding collocated BPU being unavailable, determining the motion vector associated with the BPSU as a motion vector associated with the target BPU at a BPU level.

43. The apparatus of clause 31, wherein determining the motion vector associated with the BPSU based on the motion information associated with the corresponding collocated BPU comprises:

in response to the motion information associated with the corresponding collocated BPU being unavailable, determining the motion vector based on motion information of a spatial neighboring BPSU of the BPSU; and in response to the motion information of the spatial neighboring BPSU being unavailable, determining the motion vector associated with the BPSU as a motion vector associated with the target BPU at a BPU level.

44. The apparatus of clause 43, wherein the spatial neighboring BPSU comprises one of a horizontally neighboring BPSU, a vertically neighboring BPSU, a diagonally neighboring BPSU, a clockwise neighboring BPSU, or a counterclockwise neighboring BPSU.

45. The apparatus of clause 43, wherein determining the motion vector associated with the BPSU based on the motion information of the spatial neighboring BPSU of the BPSU comprises:

determining whether motion information of a first spatial neighboring BPSU of the BPSU is available;

based on a determination that the motion information of the first spatial neighboring BPSU of the BPSU is unavailable, selecting a second spatial neighboring BPSU of the BPSU in accordance with at least one of a predetermined order or availability statuses of neighboring BPSUs of the BPSU;

determining whether motion information of the second spatial neighboring BPSU is available; and based on a determination that the motion information of the second spatial neighboring BPSU is available, determining the motion vector based on the motion information of the second spatial neighboring BPSU.

46. The apparatus of clause 31, wherein the one or more processors are further configured to execute the set of instructions to cause the apparatus to perform:

disabling determining whether an entry of a history-based motion vector predictor (HMVP) table is identical to a temporal motion vector predictor (TMVP) candidate of the list of motion candidates;

determining whether an entry of the HMVP table is identical to a spatial motion vector predictor (SMVP) candidate of the list motion candidate; and in response to the entry of the HMVP table is not identical to any SMVP candidate of the list motion candidate, inserting the entry of the HMVP table into the list of motion candidates.

47. The apparatus of clause 46, wherein disabling determining whether the entry of the HMVP table is identical to the TMVP candidate of the list of motion candidates comprises:

determining whether first motion information of a first BPSU of the set of BPSUs is identical to second motion information of a second BPSU of the set of BPSUs;

based on a determination that the first motion information is not identical to the second motion information, disabling determining whether the entry of the HMVP table is identical to the TMVP candidate of the list of motion candidates;

based on a determination that the first motion information is identical to the second motion information, determining whether the entry of the HMVP table is identical to the first motion information or the second motion information; and based on a determination that the entry of the HMVP table is not identical to the first motion information or the second motion information, inserting the entry of the HMVP table into the list of motion candidates.

48. The apparatus of clause 31, wherein the one or more processors are further configured to execute the set of instructions to cause the apparatus to perform:
updating a history-based motion vector predictor (HMVP) table using motion information of a BPSU on a right boundary, on a bottom boundary, or at a bottom-right corner of the target BPU.

49. The apparatus of clause 48, wherein the one or more processors are further configured to execute the set of instructions to cause the apparatus to perform:
before updating the HMVP table, determining whether the target BPU is coded with a skip mode or a direct mode; and
in response to the target BPU is coded with the skip mode or the direct mode, updating the HMVP table using the motion information of the BPSU on the right boundary, on the bottom boundary, or at the bottom-right corner of the target BPU.

50. The apparatus of clause 31, wherein the one or more processors are further configured to execute the set of instructions to cause the apparatus to perform:
determining whether at least one of first motion information of the collocated BPU associated with a first reference picture list or second motion information of the collocated BPU associated with a second reference picture list is available, wherein the first reference picture list and the second reference picture list are associated with the reference picture; and
based on a determination that at least one of the first motion information or the second motion information is available, determining the motion vector associated with the BPSU based on at least one of the first motion information or the second motion information.

51. The apparatus of clause 50, wherein the one or more processors are further configured to execute the set of instructions to cause the apparatus to perform:
based on a determination that none of the first motion information or the second motion information is available, determining the motion vector associated with the BPSU based on motion information of a spatial neighboring BPU of the target BPU, or determining the motion vector associated with the BPSU as a motion vector associated with the target BPU at a BPU level.

52. The apparatus of clause 50, wherein determining the motion vector associated with the BPSU based on at least one of the first motion information or the second motion information comprises:
in response to the first motion information and the second motion information being available, determining the motion vector associated with the BPSU based on the first motion information and the second motion information;
in response to the first motion information being available and the second motion information being unavailable, determining the motion vector associated with the BPSU based on the first motion information; and
in response to the first motion information being unavailable and the second motion information being available, determining the motion vector associated with the BPSU based on the second motion information.

53. The apparatus of clause 50, wherein determining the motion vector associated with the BPSU based on at least one of the first motion information or the second motion information comprises:
in response to the first motion information being available, determining the motion vector associated with the BPSU based on the first motion information;
in response to the first motion information being unavailable, determining whether the second motion information is available; and
based on a determination that the second motion information is available, determining the motion vector associated with the BPSU based on the second motion information.

54. The apparatus of any of clauses 31-53, wherein the motion information comprises at least one of a motion vector, a reference index associated with the motion vector, or a motion vector difference associated with the motion vector.

55. An apparatus, comprising:
a memory configured to store a set of instructions; and
one or more processors communicatively coupled to the memory and configured to execute the set of instructions to cause the apparatus to perform:
determining, for a target basic processing unit (BPU) of a target picture, a collocated BPU in a reference picture associated with the target picture, wherein the reference picture is a B-picture;
determining whether motion information associated with the collocated BPU is available;
based on a determination that the motion information associated with collocated BPU is available, determining a motion vector associated with the target BPU based on the motion information; and
applying motion compensation for the target BPU based on the motion vector associated with the target BPU.

56. The apparatus of clause 25, wherein the motion information associated with the collocated BPU is first motion information associated with a first reference picture list associated with the reference picture, and wherein the one or more processors are further configured to execute the set of instructions to cause the apparatus to perform:
determining whether second motion information associated with a second reference picture list associated with the reference picture is available, wherein the second reference picture list is associated with the reference picture;
based on a determination that at least one of the first motion information or the second motion information is available, determining the motion vector associated with the target BPU based on at least one of the first motion information or the second motion information; and
based on a determination that none of the first motion information or the second motion information is available, determining the motion vector associated with the target BPU based on motion information of a spatial neighboring BPU of the target BPU, or determining the motion vector associated with the target BPU as a motion vector of the target BPU at a BPU level.

57. The apparatus of clause 26, wherein determining the motion vector associated with the target BPU based on at least one of the first motion information or the second motion information comprises:
in response to the first motion information and the second motion information being available, determining the motion vector associated with the target BPU based on the first motion information and the second motion information;
in response to the first motion information being available and the second motion information being unavailable, determining the motion vector associated with the target BPU based on the first motion information; and in response to the first motion information being unavailable and the second motion information being available, determining the motion vector associated with the target BPU based on the second motion information.

58. The apparatus of clause 26, wherein determining the motion vector associated with the target BPU based on at least one of the first motion information or the second motion information comprises:

in response to the first motion information being available, determining the motion vector associated with the target BPU based on the first motion information;

in response to the first motion information being unavailable, determining whether the second motion information is available; and based on a determination that the second motion information is available, determining the motion vector associated with the target BPU based on the second motion information.

59. The apparatus of any of clauses 25-28, wherein the motion information comprises at least one of a motion vector, a reference index associated with the motion vector, or a motion vector difference associated with the motion vector.

60. The apparatus of any of clauses 25-28, wherein the one or more processors are further configured to execute the set of instructions to cause the apparatus to perform:

splitting the target BPU into a set of basic processing sub-units (BPSUs);

determining a set of collocated BPUs in the reference picture, wherein a BPSU of the set of BPSUs corresponds to a collocated BPU of the set of collocated BPUs;

determining a motion vector associated with the BPSU based on motion information associated with the corresponding collocated BPU of the set of collocated BPUs; and applying motion compensation for each of the set of BPSUs based on the motion vector associated with the BPSU.

61. A computer-implemented method, comprising:

splitting a target basic processing unit (BPU) of a target picture into a set of basic processing sub-units (BPSUs);

determining a set of collocated BPUs in a reference picture associated with the target picture, wherein a BPSU of the set of BPSUs corresponds to a collocated BPU of the set of collocated BPUs;

determining a motion vector associated with the BPSU based on motion information associated with the corresponding collocated BPU; and applying motion compensation for each of the set of BPSUs based on the motion vector associated with the BPSU.

62. The computer-implemented method of clause 61, wherein splitting the target BPU of the target picture into the set of BPSUs comprises:

splitting the target BPU into a fixed number of BPSUs in accordance with a fixed partitioning pattern.

63. The computer-implemented method of clause 61, wherein splitting the target BPU of the target picture into the set of BPSUs comprises:

in response to a width of the BPU being greater than a height of the BPU, splitting the target BPU into the set of BPSUs in accordance with a first partitioning pattern, wherein the first partitioning pattern comprises more vertical splits than horizontal splits;

in response to the width of the BPU being smaller than the height of the BPU, splitting the target BPU into the set of BPSUs in accordance with a second partitioning pattern, wherein the second partitioning pattern comprises fewer vertical splits than horizontal splits; and in response to the width of the BPU being equal to the height of the BPU, splitting the target BPU into the set of BPSUs in accordance with a third partitioning pattern, wherein the third partitioning pattern comprises the same vertical splits as horizontal splits.

64. The computer-implemented method of clause 61, wherein splitting the target BPU of the target picture into the set of BPSUs comprises:

splitting the target BPU into a fixed number of BPSUs in accordance with a partitioning pattern, wherein the partitioning pattern comprises a substantially square grid.

65. The computer-implemented method of clause 61, wherein splitting the target BPU of the target picture into the set of BPSUs comprises:

splitting the target BPU into four BPSUs in accordance with a cross pattern, wherein a width of each of the four BPSUs is a half of a width of the target BPU, and a height of each of the four BPSUs is a half of a height of the target BPU.

66. The computer-implemented method of clause 65, wherein the four BPSUs comprise a top-left BPSU, a top-right BPSU, a bottom-left BPSU, and a bottom-right BPSU, and wherein determining the set of collocated BPUs comprises:

determining, in the target picture, a first location coordinate of a top-left portion of the top-left BPSU, a second location coordinate of a top-right portion of the top-right BPSU, a third location coordinate of a bottom-left portion of the bottom-left BPSU, and a fourth location coordinate of a bottom-right portion of the bottom-right BPSU; and determining a first collocated BPU as a BPU covering a sample having the first location coordinate in the reference picture, a second collocated BPU as a BPU covering a sample having the second location coordinate in the reference picture, a third collocated BPU as a BPU covering a sample having the third location coordinate in the reference picture, and a fourth collocated BPU as a BPU covering a sample having the fourth location coordinate in the reference picture.

67. The computer-implemented method of clause 61, wherein splitting the target BPU of the target picture into the set of BPSUs comprises:

determining at least one of whether a width of the target BPU is greater than or equal to a first threshold value or whether a height of the target BPU is greater than or equal to a second threshold value;

splitting the target BPU into the set of BPSUs based on at least one of a determination that the width of the target BPU is greater than or equal to the first threshold value or a determination that the height of the target BPU is greater than or equal to the second threshold value.

68. The computer-implemented method of clause 61, wherein determining the set of collocated BPUs comprises:

determining a location coordinate of a portion of the BPSU in the target picture; and determining the collocated BPU as a BPU covering a sample having the location coordinate in the reference picture.

69. The computer-implemented method of clause 68, wherein the portion of the BPSU comprises one of a corner portion or a center portion, and wherein the corner portion comprises one of a top-left portion, a top-right portion, a bottom-left portion, or a bottom-right portion.

70. The computer-implemented method of clause 68, wherein the set of BPSUs comprises a first BPSU, a second BPSU, a third BPSU, and a fourth BPSU, and wherein determining the set of collocated BPUs comprises:

determining, in the target picture, a first location coordinate of a top-left corner of the first BPSU, a second location coordinate of a top-right corner of the second BPSU, a third location coordinate of a bottom-left corner of the third BPSU, and a fourth location coordinate of a bottom-right corner of the fourth BPSU; and determining a first collocated BPU as a BPU covering a sample having the first location coordinate in the reference picture, a second collocated BPU as a BPU covering a sample having the second location coordinate in the reference picture, a third collocated BPU as a BPU covering a sample having the third location coordinate in the reference picture, and a fourth collocated BPU as a BPU covering a sample having the fourth location coordinate in the reference picture.

71. The computer-implemented method of clause 61, wherein determining the motion vector associated with the BPSU based on the motion information associated with the corresponding collocated BPU comprises:

determining a first picture distance and a second picture distance, wherein the first picture distance is a distance between the target picture and a first reference picture the target BPU referring to, and the second picture distance is a distance between the reference picture and a second reference picture the collocated BPU referring to; and determining the motion vector associated with the BPSU by applying a motion vector scaling operation on the motion information associated with the corresponding collocated BPU based on the first picture distance and the second picture distance.

72. The computer-implemented method of clause 61, wherein determining the motion vector associated with the BPSU based on the motion information associated with the corresponding collocated BPU comprises:

in response to the motion information associated with the corresponding collocated BPU being unavailable, determining the motion vector associated with the BPSU as a motion vector associated with the target BPU at a BPU level.

73. The computer-implemented method of clause 61, wherein determining the motion vector associated with the BPSU based on the motion information associated with the corresponding collocated BPU comprises:

in response to the motion information associated with the corresponding collocated BPU being unavailable, determining the motion vector based on motion information of a spatial neighboring BPSU of the BPSU; and in response to the motion information of the spatial neighboring BPSU being unavailable, determining the motion vector associated with the BPSU as a motion vector associated with the target BPU at a BPU level.

74. The computer-implemented method of clause 73, wherein the spatial neighboring BPSU comprises one of a horizontally neighboring BPSU, a vertically neighboring BPSU, a diagonally neighboring BPSU, a clockwise neighboring BPSU, or a counterclockwise neighboring BPSU.

75. The computer-implemented method of clause 73, wherein determining the motion vector associated with the BPSU based on the motion information of the spatial neighboring BPSU of the BPSU comprises:

determining whether motion information of a first spatial neighboring BPSU of the BPSU is available;

based on a determination that the motion information of the first spatial neighboring BPSU of the BPSU is unavailable, selecting a second spatial neighboring BPSU of the BPSU in accordance with at least one of a predetermined order or availability statuses of neighboring BPSUs of the BPSU;

determining whether motion information of the second spatial neighboring BPSU is available; and based on a determination that the motion information of the second spatial neighboring BPSU is available, determining the motion vector based on the motion information of the second spatial neighboring BPSU.

76. The computer-implemented method of clause 61, further comprising:

disabling determining whether an entry of a history-based motion vector predictor (HMVP) table is identical to a temporal motion vector predictor (TMVP) candidate of the list of motion candidates;

determining whether an entry of the HMVP table is identical to a spatial motion vector predictor (SMVP) candidate of the list motion candidate; and in response to the entry of the HMVP table is not identical to any SMVP candidate of the list motion candidate, inserting the entry of the HMVP table into the list of motion candidates.

77. The computer-implemented method of clause 76, wherein disabling determining whether the entry of the HMVP table is identical to the TMVP candidate of the list of motion candidates comprises:

determining whether first motion information of a first BPSU of the set of BPSUs is identical to second motion information of a second BPSU of the set of BPSUs;

based on a determination that the first motion information is not identical to the second motion information, disabling determining whether the entry of the HMVP table is identical to the TMVP candidate of the list of motion candidates;

based on a determination that the first motion information is identical to the second motion information, determining whether the entry of the HMVP table is identical to the first motion information or the second motion information; and based on a determination that the entry of the HMVP table is not identical to the first motion information or the second motion information, inserting the entry of the HMVP table into the list of motion candidates.

78. The computer-implemented method of clause 61, further comprising:

updating a history-based motion vector predictor (HMVP) table using motion information of a BPSU on a right boundary, on a bottom boundary, or at a bottom-right corner of the target BPU.

79. The computer-implemented method of clause 78, further comprising:

before updating the HMVP table, determining whether the target BPU is coded with a skip mode or a direct mode; and in response to the target BPU is coded with the skip mode or the direct mode, updating the HMVP table using the motion information of the BPSU on the right boundary, on the bottom boundary, or at the bottom-right corner of the target BPU.

80. The computer-implemented method of clause 61, further comprising:

determining whether at least one of first motion information of the collocated BPU associated with a first reference picture list or second motion information of the collocated BPU associated with a second reference picture list is available, wherein the first reference picture list and the second reference picture list are associated with the reference picture; and based on a determination that at least one of the first motion information or the second motion information is available, determining the motion vector associated with the BPSU based on at least one of the first motion information or the second motion information.

81. The computer-implemented method of clause 80, further comprising:

based on a determination that none of the first motion information or the second motion information is available, determining the motion vector associated with the BPSU based on motion information of a spatial neighboring BPU of the target BPU, or determining the motion vector associated with the target BPU as a motion vector associated with the target BPU at a BPU level.

82. The computer-implemented method of clause 80, wherein determining the motion vector associated with the BPSU based on at least one of the first motion information or the second motion information comprises:

in response to the first motion information and the second motion information being available, determining the motion vector associated with the BPSU based on the first motion information and the second motion information;

in response to the first motion information being available and the second motion information being unavailable, determining the motion vector associated with the BPSU based on the first motion information; and in response to the first motion information being unavailable and the second motion information being available, determining the motion vector associated with the BPSU based on the second motion information.

83. The computer-implemented method of clause 80, wherein determining the motion vector associated with the BPSU based on at least one of the first motion information or the second motion information comprises:

in response to the first motion information being available, determining the motion vector associated with the BPSU based on the first motion information;

in response to the first motion information being unavailable, determining whether the second motion information is available; and based on a determination that the second motion information is available, determining the motion vector associated with the BPSU based on the second motion information.

84. The computer-implemented method of any of clauses 61-83, wherein the motion information comprises at least one of a motion vector, a reference index associated with the motion vector, or a motion vector difference associated with the motion vector.

85. A computer-implemented method, comprising:

determining, for a target basic processing unit (BPU) of a target picture, a collocated BPU in a reference picture associated with the target picture, wherein the reference picture is a B-picture;

determining whether motion information associated with the collocated BPU is available;

based on a determination that the motion information associated with collocated BPU is available, determining a motion vector associated with the target BPU based on the motion information; and applying motion compensation for the target BPU based on the motion vector associated with the target BPU.

86. The computer-implemented method of clause 85, wherein the motion information associated with the collocated BPU is first motion information associated with a first reference picture list associated with the reference picture, and further comprising:

determining whether second motion information associated with a second reference picture list associated with the reference picture is available, wherein the second reference picture list is associated with the reference picture;

based on a determination that at least one of the first motion information or the second motion information is available, determining the motion vector associated with the target BPU based on at least one of the first motion information or the second motion information; and based on a determination that none of the first motion information or the second motion information is available, determining the motion vector associated with the target BPU based on motion information of a spatial neighboring BPU of the target BPU, or determining the motion vector associated with the target BPU as a motion vector of the target BPU at a BPU level.

87. The computer-implemented method of clause 86, wherein determining the motion vector associated with the target BPU based on at least one of the first motion information or the second motion information comprises:

in response to the first motion information and the second motion information being available, determining the motion vector associated with the target BPU based on the first motion information and the second motion information;

in response to the first motion information being available and the second motion information being unavailable, determining the motion vector associated with the target BPU based on the first motion information; and in response to the first motion information being unavailable and the second motion information being available, determining the motion vector associated with the target BPU based on the second motion information.

88. The computer-implemented method of clause 86, wherein determining the motion vector associated with the target BPU based on at least one of the first motion information or the second motion information comprises:

in response to the first motion information being available, determining the motion vector associated with the target BPU based on the first motion information;

in response to the first motion information being unavailable, determining whether the second motion information is available; and based on a determination that the second motion information is available, determining the motion vector associated with the target BPU based on the second motion information.

89. The computer-implemented method of any of clauses 85-88, wherein the motion information comprises at least one of a motion vector, a reference index associated with the motion vector, or a motion vector difference associated with the motion vector.

90. The computer-implemented method of any of clauses 85-88, further comprising:

splitting the target BPU into a set of basic processing sub-units (BPSUs);

determining a set of collocated BPUs in the reference picture, wherein a BPSU of the set of BPSUs corresponds to a collocated BPU of the set of collocated BPUs;

determining a motion vector associated with the BPSU based on motion information associated with the corresponding collocated BPU of the set of collocated BPUs; and applying motion compensation for each of the set of BPSUs based on the motion vector associated with the BPSU.

In the drawings and specification, there have been disclosed example embodiments. However, many variations and modifications can be made to these embodiments.

Accordingly, although specific terms are employed, they are used in a generic and descriptive sense only and not for purposes of limitation.

What is claimed is:

1. A non-transitory computer-readable medium storing a set of instructions that is executable by at least one processor of an apparatus to cause the apparatus to perform a method, the method comprising:
   splitting a target basic processing unit (BPU) of a target picture into a set of basic processing sub-units (BPSUs);
   determining a set of collocated BPUs in a reference picture associated with the target picture, wherein a BPSU of the set of BPSUs corresponds to a collocated BPU of the set of collocated BPUs;
   determining a motion vector associated with the BPSU based on motion information associated with the corresponding collocated BPU; and
   applying motion compensation for each of the set of BPSUs based on the motion vector associated with the BPSU.

2. The non-transitory computer-readable medium of claim 1, wherein splitting the target BPU of the target picture into the set of BPSUs comprises:
   splitting the target BPU into a fixed number of BPSUs in accordance with a fixed partitioning pattern.

3. The non-transitory computer-readable medium of claim 1, wherein splitting the target BPU of the target picture into the set of BPSUs comprises:
   splitting the target BPU into four BPSUs in accordance with a cross pattern, wherein a width of each of the four BPSUs is a half of a width of the target BPU, and a height of each of the four BPSUs is a half of a height of the target BPU.

4. The non-transitory computer-readable medium of claim 3, wherein the four BPSUs comprise a top-left BPSU, a top-right BPSU, a bottom-left BPSU, and a bottom-right BPSU, and wherein determining the set of collocated BPUs comprises:
   determining, in the target picture, a first location coordinate of a top-left portion of the top-left BPSU, a second location coordinate of a top-right portion of the top-right BPSU, a third location coordinate of a bottom-left portion of the bottom-left BPSU, and a fourth location coordinate of a bottom-right portion of the bottom-right BPSU; and
   determining a first collocated BPU as a BPU covering a sample having the first location coordinate in the reference picture, a second collocated BPU as a BPU covering a sample having the second location coordinate in the reference picture, a third collocated BPU as a BPU covering a sample having the third location coordinate in the reference picture, and a fourth collocated BPU as a BPU covering a sample having the fourth location coordinate in the reference picture.

5. The non-transitory computer-readable medium of claim 1, wherein splitting the target BPU of the target picture into the set of BPSUs comprises:
   determining at least one of whether a width of the target BPU is greater than or equal to a first threshold value or whether a height of the target BPU is greater than or equal to a second threshold value;
   splitting the target BPU into the set of BPSUs based on at least one of a determination that the width of the target BPU is greater than or equal to the first threshold value or a determination that the height of the target BPU is greater than or equal to the second threshold value.

6. The non-transitory computer-readable medium of claim 1, wherein determining the motion vector associated with the BPSU based on the motion information associated with the corresponding collocated BPU comprises:
   determining a first picture distance and a second picture distance, wherein the first picture distance is a distance between the target picture and a first reference picture the target BPU referring to, and the second picture distance is a distance between the reference picture and a second reference picture the collocated BPU referring to; and
   determining the motion vector associated with the BPSU by applying a motion vector scaling operation on the motion information associated with the corresponding collocated BPU based on the first picture distance and the second picture distance.

7. The non-transitory computer-readable medium of claim 1, wherein determining the motion vector associated with the BPSU based on the motion information associated with the corresponding collocated BPU comprises:
   in response to the motion information associated with the corresponding collocated BPU being unavailable, determining the motion vector associated with the BPSU as a motion vector associated with the target BPU at a BPU level.

8. The non-transitory computer-readable medium of claim 1, wherein the set of instructions that is executable by the at least one processor of the apparatus causes the apparatus to further perform:
   determining whether at least one of first motion information of the collocated BPU associated with a first reference picture list or second motion information of the collocated BPU associated with a second reference picture list is available, wherein the first reference picture list and the second reference picture list are associated with the reference picture; and
   based on a determination that at least one of the first motion information or the second motion information is available, determining the motion vector associated with the BPSU based on at least one of the first motion information or the second motion information.

9. The non-transitory computer-readable medium of claim 8, wherein the set of instructions that is executable by the at least one processor of the apparatus causes the apparatus to further perform:
   based on a determination that none of the first motion information or the second motion information is available, determining the motion vector associated with the BPSU based on motion information of a spatial neighboring BPU of the target BPU, or determining the motion vector associated with the BPSU as a motion vector associated with the target BPU at a BPU level.

10. The non-transitory computer-readable medium of claim 8, wherein determining the motion vector associated with the BPSU based on at least one of the first motion information or the second motion information comprises:
   in response to the first motion information being available, determining the motion vector associated with the BPSU based on the first motion information;
   in response to the first motion information being unavailable, determining whether the second motion information is available; and
   based on a determination that the second motion information is available, determining the motion vector associated with the BPSU based on the second motion information.

11. An apparatus, comprising:
a memory configured to store a set of instructions; and
one or more processors communicatively coupled to the memory and configured to execute the set of instructions to cause the apparatus to perform:
   splitting a target basic processing unit (BPU) of a target picture into a set of basic processing sub-units (BPSUs);
   determining a set of collocated BPUs in a reference picture associated with the target picture, wherein a BPSU of the set of BPSUs corresponds to a collocated BPU of the set of collocated BPUs;
   determining a motion vector associated with the BPSU based on motion information associated with the corresponding collocated BPU; and
   applying motion compensation for each of the set of BPSUs based on the motion vector associated with the BPSU.

12. The apparatus of claim 11, wherein splitting the target BPU of the target picture into the set of BPSUs comprises:
   splitting the target BPU into a fixed number of BPSUs in accordance with a fixed partitioning pattern.

13. The apparatus of claim 11, wherein splitting the target BPU of the target picture into the set of BPSUs comprises:
   splitting the target BPU into four BPSUs in accordance with a cross pattern, wherein a width of each of the four BPSUs is a half of a width of the target BPU, and a height of each of the four BPSUs is a half of a height of the target BPU.

14. The apparatus of claim 13, wherein the four BPSUs comprise a top-left BPSU, a top-right BPSU, a bottom-left BPSU, and a bottom-right BPSU, and wherein determining the set of collocated BPUs comprises:
   determining, in the target picture, a first location coordinate of a top-left portion of the top-left BPSU, a second location coordinate of a top-right portion of the top-right BPSU, a third location coordinate of a bottom-left portion of the bottom-left BPSU, and a fourth location coordinate of a bottom-right portion of the bottom-right BPSU; and
   determining a first collocated BPU as a BPU covering a sample having the first location coordinate in the reference picture, a second collocated BPU as a BPU covering a sample having the second location coordinate in the reference picture, a third collocated BPU as a BPU covering a sample having the third location coordinate in the reference picture, and a fourth collocated BPU as a BPU covering a sample having the fourth location coordinate in the reference picture.

15. The apparatus of claim 11, wherein splitting the target BPU of the target picture into the set of BPSUs comprises:
   determining at least one of whether a width of the target BPU is greater than or equal to a first threshold value or whether a height of the target BPU is greater than or equal to a second threshold value;
   splitting the target BPU into the set of BPSUs based on at least one of a determination that the width of the target BPU is greater than or equal to the first threshold value or a determination that the height of the target BPU is greater than or equal to the second threshold value.

16. The apparatus of claim 11, wherein determining the motion vector associated with the BPSU based on the motion information associated with the corresponding collocated BPU comprises:
   determining a first picture distance and a second picture distance, wherein the first picture distance is a distance between the target picture and a first reference picture the target BPU referring to, and the second picture distance is a distance between the reference picture and a second reference picture the collocated BPU referring to; and
   determining the motion vector associated with the BPSU by applying a motion vector scaling operation on the motion information associated with the corresponding collocated BPU based on the first picture distance and the second picture distance.

17. The apparatus of claim 11, wherein determining the motion vector associated with the BPSU based on the motion information associated with the corresponding collocated BPU comprises:
   in response to the motion information associated with the corresponding collocated BPU being unavailable, determining the motion vector associated with the BPSU as a motion vector associated with the target BPU at a BPU level.

18. The apparatus of claim 11, wherein the one or more processors are further configured to execute the set of instructions to cause the apparatus to perform:
   determining whether at least one of first motion information of the collocated BPU associated with a first reference picture list or second motion information of the collocated BPU associated with a second reference picture list is available, wherein the first reference picture list and the second reference picture list are associated with the reference picture; and
   based on a determination that at least one of the first motion information or the second motion information is available, determining the motion vector associated with the BPSU based on at least one of the first motion information or the second motion information.

19. The apparatus of claim 18, wherein the one or more processors are further configured to execute the set of instructions to cause the apparatus to perform:
   based on a determination that none of the first motion information or the second motion information is available, determining the motion vector associated with the BPSU based on motion information of a spatial neighboring BPU of the target BPU, or determining the motion vector associated with the BPSU as a motion vector associated with the target BPU at a BPU level.

20. The apparatus of claim 18, wherein determining the motion vector associated with the BPSU based on at least one of the first motion information or the second motion information comprises:
   in response to the first motion information being available, determining the motion vector associated with the BPSU based on the first motion information;
   in response to the first motion information being unavailable, determining whether the second motion information is available; and
   based on a determination that the second motion information is available, determining the motion vector associated with the BPSU based on the second motion information.

21. A computer-implemented method, comprising:
splitting a target basic processing unit (BPU) of a target picture into a set of basic processing sub-units (BPSUs);
   determining a set of collocated BPUs in a reference picture associated with the target picture, wherein a BPSU of the set of BPSUs corresponds to a collocated BPU of the set of collocated BPUs;

determining a motion vector associated with the BPSU based on motion information associated with the corresponding collocated BPU; and applying motion compensation for each of the set of BPSUs based on the motion vector associated with the BPSU.

22. The computer-implemented method of claim 21, wherein splitting the target BPU of the target picture into the set of BPSUs comprises:
   splitting the target BPU into a fixed number of BPSUs in accordance with a fixed partitioning pattern.

23. The computer-implemented method of claim 21, wherein splitting the target BPU of the target picture into the set of BPSUs comprises:
   splitting the target BPU into four BPSUs in accordance with a cross pattern, wherein a width of each of the four BPSUs is a half of a width of the target BPU, and a height of each of the four BPSUs is a half of a height of the target BPU.

24. The computer-implemented method of claim 23, wherein the four BPSUs comprise a top-left BPSU, a top-right BPSU, a bottom-left BPSU, and a bottom-right BPSU, and wherein determining the set of collocated BPUs comprises:
   determining, in the target picture, a first location coordinate of a top-left portion of the top-left BPSU, a second location coordinate of a top-right portion of the top-right BPSU, a third location coordinate of a bottom-left portion of the bottom-left BPSU, and a fourth location coordinate of a bottom-right portion of the bottom-right BPSU; and
   determining a first collocated BPU as a BPU covering a sample having the first location coordinate in the reference picture, a second collocated BPU as a BPU covering a sample having the second location coordinate in the reference picture, a third collocated BPU as a BPU covering a sample having the third location coordinate in the reference picture, and a fourth collocated BPU as a BPU covering a sample having the fourth location coordinate in the reference picture.

25. The computer-implemented method of claim 21, wherein splitting the target BPU of the target picture into the set of BPSUs comprises:
   determining at least one of whether a width of the target BPU is greater than or equal to a first threshold value or whether a height of the target BPU is greater than or equal to a second threshold value;
   splitting the target BPU into the set of BPSUs based on at least one of a determination that the width of the target BPU is greater than or equal to the first threshold value or a determination that the height of the target BPU is greater than or equal to the second threshold value.

26. The computer-implemented method of claim 21, wherein determining the motion vector associated with the BPSU based on the motion information associated with the corresponding collocated BPU comprises:
   determining a first picture distance and a second picture distance, wherein the first picture distance is a distance between the target picture and a first reference picture the target BPU referring to, and the second picture distance is a distance between the reference picture and a second reference picture the collocated BPU referring to; and
   determining the motion vector associated with the BPSU by applying a motion vector scaling operation on the motion information associated with the corresponding collocated BPU based on the first picture distance and the second picture distance.

27. The computer-implemented method of claim 21, wherein determining the motion vector associated with the BPSU based on the motion information associated with the corresponding collocated BPU comprises:
   in response to the motion information associated with the corresponding collocated BPU being unavailable, determining the motion vector associated with the BPSU as a motion vector associated with the target BPU at a BPU level.

28. The computer-implemented method of claim 21, further comprising:
   determining whether at least one of first motion information of the collocated BPU associated with a first reference picture list or second motion information of the collocated BPU associated with a second reference picture list is available, wherein the first reference picture list and the second reference picture list are associated with the reference picture; and
   based on a determination that at least one of the first motion information or the second motion information is available, determining the motion vector associated with the BPSU based on at least one of the first motion information or the second motion information.

29. The computer-implemented method of claim 28, further comprising:
   based on a determination that none of the first motion information or the second motion information is available, determining the motion vector associated with the BPSU based on motion information of a spatial neighboring BPU of the target BPU, or determining the motion vector associated with the target BPU as a motion vector associated with the target BPU at a BPU level.

30. The computer-implemented method of claim 28, wherein determining the motion vector associated with the BPSU based on at least one of the first motion information or the second motion information comprises:
   in response to the first motion information being available, determining the motion vector associated with the BPSU based on the first motion information;
   in response to the first motion information being unavailable, determining whether the second motion information is available; and
   based on a determination that the second motion information is available, determining the motion vector associated with the BPSU based on the second motion information.

* * * * *